United States Patent
Sato et al.

(10) Patent No.: US 11,062,213 B2
(45) Date of Patent: Jul. 13, 2021

(54) TABLE-MEANING ESTIMATION SYSTEM, METHOD, AND PROGRAM

(71) Applicant: NEC CORPORATION, Tokyo (JP)

(72) Inventors: Hideaki Sato, Tokyo (JP); Masafumi Oyamada, Tokyo (JP); Shinji Nakadai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 286 days.

(21) Appl. No.: 15/756,108

(22) PCT Filed: Jul. 25, 2017

(86) PCT No.: PCT/JP2017/026882
§ 371 (c)(1),
(2) Date: Feb. 28, 2018

(87) PCT Pub. No.: WO2018/025706
PCT Pub. Date: Feb. 8, 2018

(65) Prior Publication Data
US 2018/0240019 A1    Aug. 23, 2018

(30) Foreign Application Priority Data
Aug. 5, 2016 (JP) .............................. JP2016-154384

(51) Int. Cl.
*G06N 5/02* (2006.01)
*G06F 16/22* (2019.01)
*G06N 20/00* (2019.01)
*G06F 40/30* (2020.01)
*G06F 40/177* (2020.01)

(52) U.S. Cl.
CPC .............. *G06N 5/02* (2013.01); *G06F 16/221* (2019.01); *G06F 40/177* (2020.01); *G06F 40/30* (2020.01); *G06N 20/00* (2019.01)

(58) Field of Classification Search
CPC ....................................................... G06N 20/00
See application file for complete search history.

(56) References Cited

U.S. PATENT DOCUMENTS

2011/0047156 A1* 2/2011 Knight ................... G06N 5/02
                                                         707/737
2015/0309990 A1    10/2015 Allen et al.

FOREIGN PATENT DOCUMENTS

| JP | 2004-334369 A | 11/2004 |
| JP | 2013-120534 A | 6/2013 |
| JP | 2014-48741 A | 3/2014 |

OTHER PUBLICATIONS

J. Wang et al., "Understanding tables on the web", Conceptual Modeling, P. Atzeni, D. Cheung, and S. Ram (eds), Springer, Lecture Notes in Computer Science, 2012, 14 pages. (Year: 2012).*

(Continued)

*Primary Examiner* — Vincent Gonzales
(74) *Attorney, Agent, or Firm* — Sughrue Mion, PLLC

(57) ABSTRACT

A learning means 71 learns, based on learning data containing the meaning of a column in a table and the meaning of the table, a model indicating regularity between the meaning of the column in the table and the meaning of the table. An estimation means 72 estimates the meaning of the table based on the meaning of a column of a table to be input and the model.

4 Claims, 17 Drawing Sheets

| NAME | BIRTHPLACE | SEX | JOB |
|---|---|---|---|
| SATO | IBARAKI | MALE | OFFICE WORKER |
| SUZUKI | TOCHIGI | FEMALE | ENGINEER |
| TANAKA | HOKKAIDO | MALE | ENGINEER |
| . | . | . | . |
| . | . | . | . |
| . | . | . | . |
| NAKADAI | MIYAGI | MALE | RESEARCHER |

MEANING OF TABLE: CUSTOMER TABLE

(56) References Cited

OTHER PUBLICATIONS

Petros Venetis et al., "Recovering Semantics of Tables on the Web", [Searched on Jul. 20, 2016], Internet <URL: http://www.vldb.org/pvldb/vol4/p528-venetis.pdf >, pp. 528-538.
Burr Settles, "Active Learning Literature Survey", University of Wisconsin Madison Technical Report #1648, Jan. 2009, 47 pages.
Takashi Otani et al., "A Method for Analysis of Table Contents of HTML Format and Its Application", IPSJ SIG Notes, Mar. 7, 2003, pp. 137-144, vol. 2003, No. 23.
Written Opinion for PCT/JP2017/026882, dated Oct. 3, 2017.
International Search Report for PCT/JP2017/026882, dated Oct. 3, 2017.

* cited by examiner

FIG. 2

| NAME | BIRTHPLACE | SEX | JOB |
|---|---|---|---|
| SATO | IBARAKI | MALE | OFFICE WORKER |
| SUZUKI | TOCHIGI | FEMALE | ENGINEER |
| TANAKA | HOKKAIDO | MALE | ENGINEER |
| . | . | . | . |
| . | . | . | . |
| . | . | . | . |
| NAKADAI | MIYAGI | MALE | RESEARCHER |

MEANING OF TABLE: CUSTOMER TABLE

FIG. 3

$f(x) = W^T x$
$x = (x_1, x_2, x_3, \cdots, x_n)^T$
$W = (w_1, w_2, w_3, \cdots, w_n)^T$ TABLE-MEANING SET:
{CUSTOMER TABLE, ITEM TABLE, PURCHASE LOG TABLE, $\cdots$}

FIG. 4

IS THE FOLLOWING TABLE A CUSTOMER TABLE?

| NAME | BIRTHPLACE | SEX | JOB | ... |
|------|------------|-----|-----|-----|
| YAMADA | YAMANASHI | MALE | SELF-EMPLOYMENT | ... |
| KATO | TOKYO | FEMALE | ENGINEER | ... |
| . | . | . | . | . |
| . | . | . | . | . |
| . | . | . | . | . |

51 — YES

52 — NO

| NAME | BIRTHPLACE | SEX | JOB | ... |
|---|---|---|---|---|
| YAMADA | YAMANASHI | MALE | SELF-EMPLOYMENT | ... |
| KATO | TOKYO | FEMALE | ENGINEER | ... |
| . | . | . | . | . |
| . | . | . | . | . |
| . | . | . | . | . |

FIG. 12

| NAME | is | SATO |
|---|---|---|
| NAME | is | SUZUKI |
| NAME | is | TANAKA |
| . | . | . |
| . | . | . |
| . | . | . |

| BIRTHPLACE | is | IBARAKI |
|---|---|---|
| BIRTHPLACE | is | TOCHIGI |
| BIRTHPLACE | is | MIYAGI |
| . | . | . |
| . | . | . |
| . | . | . |

| JOB | is | OFFICE WORKER |
|---|---|---|
| JOB | is | ENGINEER |
| JOB | is | RESEARCHER |
| . | . | . |
| . | . | . |
| . | . | . |

| SEX | is | MALE |
|---|---|---|
| SEX | is | FEMALE |

.
.
.

| CUSTOMER NAME | PREFECTURE | TYPE | WORK | ... |
|---|---|---|---|---|
| YAMADA | YAMANASHI | MALE | SELF-EMPLOYMENT | ... |
| KATO | TOKYO | FEMALE | ENGINEER | ... |
| . | . | . | . | . |
| . | . | . | . | . |
| . | . | . | . | . |

FIG. 18

- INPUT MEANING OF THE FOLLOWING TABLE.
- SELECT CHARACTERISTIC COLUMNS REPRESENTING MEANING OF THE TABLE

CUSTOMER TABLE ~62

| NAME | BIRTHPLACE | SEX | JOB |
|---|---|---|---|
| SATO | IBARAKI | MALE | OFFICE WORKER |
| SUZUKI | TOCHIGI | FEMALE | ENGINEER |
| TANAKA | HOKKAIDO | MALE | ENGINEER |
| . | . | . | |
| . | . | . | |
| . | . | . | |
| NAKADAI | MIYAGI | MALE | RESEARCHER |

~61

   

63

DETERMINE ~64

FIG. 19

| TABLE NAME | MEANING OF TABLE |
|---|---|
| CustomerTables | |
| Customer | |
| CusomerHistory | Customer |
| Customera | |
| Customerb | |
| : | |

$f(x) = W^T x$
$x = (x_1, x_2, x_3, \cdots, x_n)^T$
$W = (w_1, w_2, w_3, \cdots, w_n)^T$ TABLE-MEANING SET:
{Customer, Store, $\cdots$}

$x = (x_1, x_2, x_3, \cdots, x_h, \cdots, x_n)^T$ aa  ab  ac  $\cdots$  st  $\cdots$  zz

TABLE-MEANING ESTIMATION SYSTEM, METHOD, AND PROGRAM

CROSS REFERENCE TO RELATED APPLICATIONS

This application is a National Stage of International Application No. PCT/JP2017/026882 filed Jul. 25, 2017, claiming priority based on Japanese Patent Application No. 2016-154384 filed Aug. 5, 2016, the entire disclosures of which are incorporated herein in their entirety.

TECHNICAL FIELD

The present invention relates to a table-meaning estimation system, a table-meaning estimation method, and a table-meaning estimation program which are for estimating the meaning of a table.

BACKGROUND ART

Non-patent document 1 discloses a technique for automatically estimating column names in a table using an ontology stored in a knowledge database. Non-Patent Document 1 further discloses that one of column names is applied to a table name.

Furthermore, Non-Patent Document 2 discloses active learning.

Patent Document 1 discloses that the rules for naming a table is commonly used by the cache servers and the application server.

Patent Document 2 discloses that a vector optimal for classifying column-name-constituting words is generated by supervised learning.

CITATION LIST

Patent Literature

PTL 1: Japanese Patent Application Laid-Open No. 2014-48741
PTL 2: Japanese Patent Application Laid-Open No. 2013-120534

Non Patent Literature

NPL 1: Petros Venetis and seven others, "Recovering meanings of Tables on the Web", [Searched on Jul. 20, 2016], Internet<URL:http://www.vldb.org/pvldb/vol4/p528-venetis.pdf>
NPL 2: Burr Settles, "Active Learning Literature Survey", University of Wisconsin Madison Technical Report #1648, January, 2009

SUMMARY OF INVENTION

Technical Problem

A column name is a name actually assigned to a column in a table. Generally, column names are determined by humans, and notation variants occur in column names. For example, as the column name of a column having the sex of a person as an attribute value, various column names such as "type" and "male/female" can be assigned. Here, the concept represented by the column is referred to as "the meaning of a column" distinguished from a column name. In the above example, "sex" corresponds to the meaning of the column.

Similarly, the concept represented by the table is referred to as "the meaning of a table". There is a case in which a table name is assigned or is not assigned to a table. Here, although a table name is assigned to a table, the table name is not necessarily appropriate as the concept of the table. For example, as disclosed in Non-Patent Document 1, although a table name is determined by applying one of column names to the table name, the table name does not necessarily represent the concept of the table. Thus, the concept represented by the table is distinguished from the table name, and is referred to as the meaning of the table.

In the technique disclosed in Non-Patent Document 1, it can be said that the ontology is used to estimate the meaning of the column.

Typical analysis patterns are used to perform automated analyzes in some cases. For example, there is a typical analysis pattern for analyzing purchasing behaviors performed by who and how. However, grasping the meaning of a table used in such analysis is performed manually. Thus, there is a problem that it takes time to grasp the meaning of the table used in the analysis.

In addition, migration work of a database is performed in some cases. At this time, a worker different from a worker using the database before the migration uses the table after the migration in some cases. The worker takes time to grasp the meaning of the table after the migration, and cannot smoothly use the database after the migration.

Thus, a purpose of the present invention is to provide a table-meaning estimation system, a table-meaning estimation method, and a table-meaning estimation program which are capable of estimating the meaning of a table.

Solution to Problem

A table-meaning estimation system according to the present invention includes a learning means for learning, based on learning data containing a meaning of a column in a table and a meaning of the table, a model indicating regularity between the meaning of the column in the table and the meaning of the table, and an estimation means for estimating, based on a meaning of a column in a table to be input and the model, the meaning of the table.

A table-meaning estimation system according to the present invention includes an input accepting means for accepting input of a table, and an estimation means for estimating a meaning of the table based on a meaning of a column in the table and a model learnt beforehand, in which the model is a model learnt based on learning data containing the meaning of the column in the table and the meaning of the table, and indicating regularity between the meaning of the column in the table and the meaning of the table.

A table-meaning estimation system according to the present invention includes a learning means for learning, based on learning data containing a table name of a table and a meaning of the table, a model indicating regularity between the table name and the meaning of the table, and an estimation means for estimating, based on a table name of a table to be input and the model, the meaning of the table.

A table-meaning estimation system according to the present invention includes an input accepting means for accepting input of a table, and an estimation means for estimating a meaning of the table based on a table name of the table and a model learnt beforehand, in which the model is a model learnt based on learning data containing the table name of the table and the meaning of the table, and indicating regularity between the table name and the meaning of the table.

A table-meaning estimation method according to the present invention includes learning, based on learning data containing a meaning of a column in a table and a meaning of the table, a model indicating regularity between the meaning of the column in the table and the meaning of the table, and estimating, based on a meaning of a column in a table to be input and the model, the meaning of the table.

A table-meaning estimation method according to the present invention includes accepting input of a table, and estimating a meaning of the table based on a meaning of a column in the table and a model learnt beforehand, in which the model is a model learnt based on learning data containing the meaning of the column in the table and the meaning of the table, and indicating regularity between the meaning of the column in the table and the meaning of the table.

A table-meaning estimation method according to the present invention includes learning, based on learning data containing a table name of a table and a meaning of the table, a model indicating regularity between the table name and the meaning of the table, and estimating, based on a table name of a table to be input and the model, the meaning of the table.

A table-meaning estimation method according to the present invention includes accepting input of a table, and estimating a meaning of the table based on a table name of the table and a model learnt beforehand, in which the model is a model learnt based on learning data containing the table name of the table and the meaning of the table, and indicating regularity between the table name and the meaning of the table.

A table-meaning estimation program according to the present invention causes a computer to execute learning processing for learning, based on learning data containing a meaning of a column in a table and a meaning of the table, a model indicating regularity between the meaning of the column in the table and the meaning of the table, and estimation processing for estimating, based on a meaning of a column in a table to be input and the model, the meaning of the table.

A table-meaning estimation program according to the present invention causes a computer to execute input-accepting processing for accepting input of a table, and estimation processing for estimating a meaning of the table based on a meaning of a column in the table and a model learnt beforehand, in which the model is a model learnt based on learning data containing the meaning of the column in the table and the meaning of the table, and indicating regularity between the meaning of the column in the table and the meaning of the table.

A table-meaning estimation program according to the present invention causes a computer to execute learning processing for learning, based on learning data containing a table name of a table and a meaning of the table, a model indicating regularity between the table name and the meaning of the table, and estimation processing for estimating, based on a table name of a table to be input and the model, the meaning of the table.

A table-meaning estimation program according to the present invention causes a computer to execute input-accepting processing for accepting input of a table, and estimation processing for estimating a meaning of the table based on a table name of the table and a model learnt beforehand, in which the model is a model learnt based on learning data containing the table name of the table and the meaning of the table, and indicating regularity between the table name and the meaning of the table.

Advantageous Effects of Invention

According to the present invention, it is possible to estimate the meaning of a table.

BRIEF DESCRIPTION OF DRAWINGS

FIG. 2 It depicts a schematic diagram showing an example of a combination of a table in which each column name is replaced with the meaning of the column, and the meaning of the table.

FIG. 3 It depicts an explanatory diagram showing an example of a table-meaning model.

FIG. 4 It depicts a schematic diagram showing an example of a screen displaying an estimation result of the meaning of a table and the like.

FIG. 12 It depicts a schematic diagram showing an example of relation information.

FIG. 18 It depicts an explanatory diagram showing an example of a screen including a table, an input field of the meaning of the table, and check boxes.

FIG. 19 It depicts a schematic diagram showing an example of a combination of a table name and the meaning of the table.

DESCRIPTION OF EMBODIMENTS

Hereinafter, exemplary embodiments of the present invention will be described with reference to the drawings.

In the present invention, a set of meanings of a table (hereinafter, referred to as a table-meaning set) is prepared. The number of meanings of a table belonging to the table-meaning set is finite. In the present invention, the meaning of a table as a meaning estimation target is estimated by selecting the meaning of the table from the table-meaning set.

First Exemplary Embodiment

Figure 1:
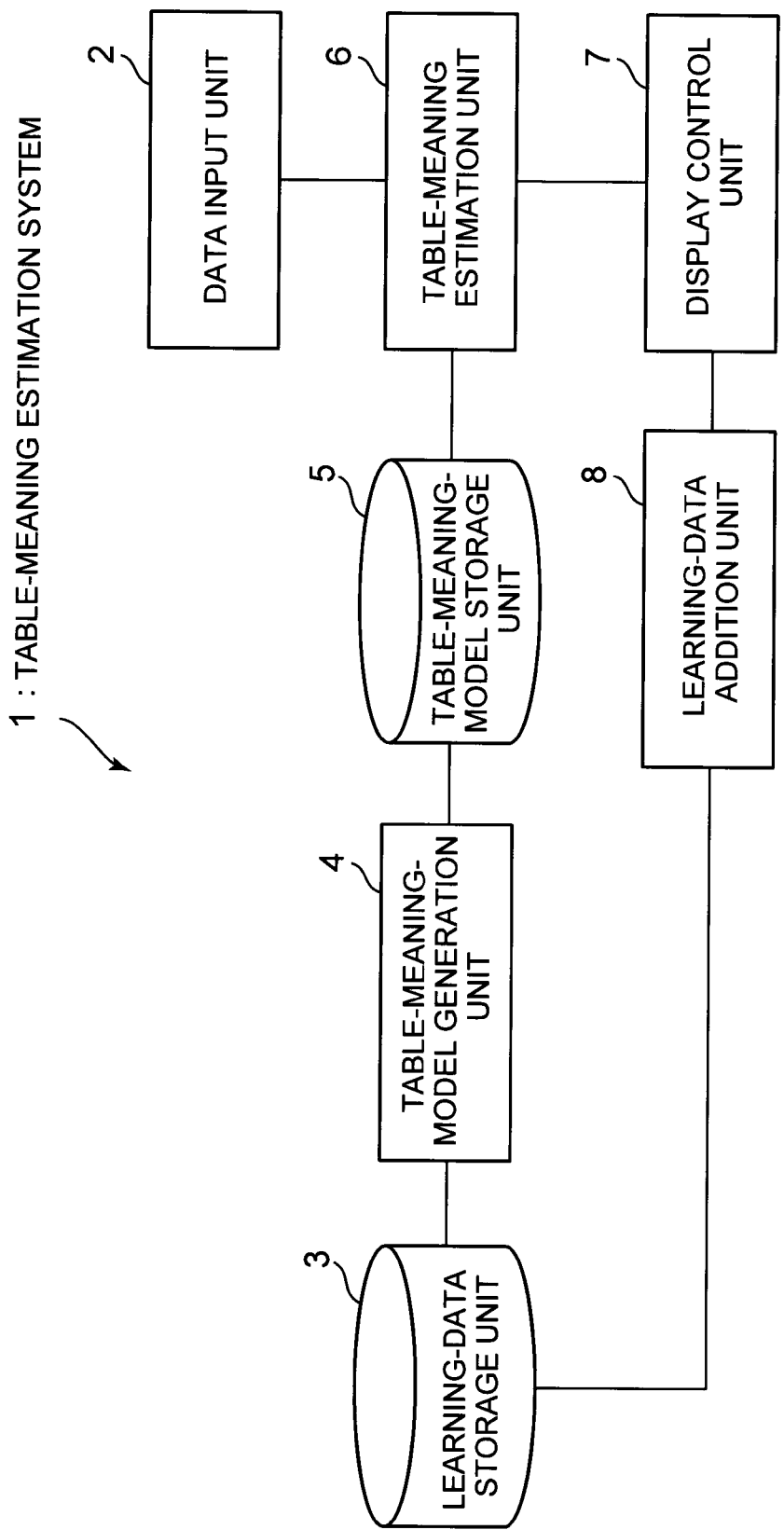
FIG. 1 It depicts a block diagram showing a configuration example of a table-meaning estimation system in a first exemplary embodiment of the present invention.

FIG. 1 is a block diagram showing a configuration example of a table-meaning estimation system in a first exemplary embodiment of the present invention. A table-meaning estimation system 1 includes a data input unit 2, a learning-data storage unit 3, a table-meaning-model generation unit 4, a table-meaning-model storage unit 5, a table-meaning estimation unit 6, a display control unit 7, and a learning-data addition unit 8.

The data input unit 2 is an input device to which data is input. In the present exemplary embodiment, a set of meanings of columns in a table as a meaning estimation target is input to the data input unit 2. In the following description, it is assumed that a table in which each column name is replaced with the meaning of the column is input to the data input unit 2. In this case, processing for replacing each column name with the meaning of the column is performed as pre-processing to the table to be input to the data input unit 2. As the method for specifying the meaning of each column, for example, the method disclosed in Non-Patent Document 1 is used, or other methods may be used. For example, the meaning of each column in the table to be input is estimated by the method disclosed in Non-Patent Document 1, and an external system (not shown) of the table-meaning estimation system 1 performs pre-processing for replacing each column name with the estimated meaning of each column. By replacing the column name with the meaning of the column, notation variants of column names are excluded. The table after the pre-processing is input to the data input unit 2.

Here, the set of meanings of columns is predetermined. In addition, it is assumed that the number of meanings of a column belonging to the set of meanings of columns is finite. For example, it is assumed that the above external system estimates the meaning of a column by selecting the meaning of the column from the set.

The learning-data storage unit 3 is a storage device that stores learning data. In the present exemplary embodiment, the learning-data storage unit 3 stores learning data used for learning of an estimation model for estimating the meaning of a table from the meaning of a column in the table. The learning data includes the meaning of a column in a table and the meaning of the table. In the following example, it is assumed that the learning-data storage unit 3 stores a set of combinations of tables in which each column name is replaced with the meaning of the column and the meanings of the tables. For example, the above external system performs, for each table the meaning of which is known, processing for estimating the meaning of each column in the table by the method disclosed in Non-Patent Document 1 and replacing each column name with the estimated meaning of each column. For example, it is assumed that there are originally four columns in the table, and that column names of "CUSTOMER NAME", "PREFECTURE", "TYPE", and "WORK" are assigned to these columns. It is further assumed that the estimation results of the meanings of these columns are "NAME", "BIRTHPLACE", "SEX", and "JOB". In this case, the column names of "CUSTOMER NAME", "PREFECTURE", "TYPE", and "WORK" are replaced with the meanings of the columns "NAME", "BIRTHPLACE", "SEX", and "JOB" respectively. Then, the learning-data storage unit 3 stores, as learning data, a set of combinations of the tables to which the processing is performed and the meanings of the tables. As described above, it is assumed that the set of meanings of columns is determined in advance, and that the number of meanings of a column belonging to the set is finite.

FIG. 2 is a schematic diagram showing an example of a combination of a table in which each column name is replaced with the meaning of the column, and the meaning of the table. The "NAME", "BIRTHPLACE", "SEX", and "JOB" shown in FIG. 2 are the meanings of the columns. In addition, it is assumed that the meaning of the table shown in FIG. 2 is known as "Customer Table". The learning-data storage unit 3 stores a set of combinations of tables and meanings of the tables as shown in FIG. 2.

In the following description, an estimation model for estimating the meaning of a table is referred to as a table-meaning model.

The table-meaning-model generation unit 4 generates a table-meaning model based on the learning data. In other words, the table-meaning-model generation unit 4 learns a table-meaning model by machine learning using the learning data. The method of machine learning is not particularly limited. In the present exemplary embodiment, the table-meaning-model generation unit 4 generates a table-meaning model for estimating the meaning of a table from the meaning of the column in the table. It can be said that this table-meaning model is a model indicating the regularity between the meaning of the column in the table and the meaning of the table.

FIG. 3 is an explanatory diagram showing an example of a table-meaning model generated by the table-meaning-model generation unit 4. Both of W and x shown in FIG. 3 are column vectors, and W and x are appropriately indicated as transposed matrices of row vectors. In the following description, "T" means a transposed matrix.

The number of meanings of a column belonging to the set of meanings of columns is "n". In $x=(x_1, x_2, x_3, \ldots, x_n)^T$, $x_1$ to $x_n$ are explanatory variables corresponding to the meanings of the n number of columns on a one to one basis, and x is a vector having the n number of explanatory variables of $x_1$ to $x_n$ as elements. The value of each explanatory variable is determined as "1" when the meaning of the corresponding column is included in the table, or determined as "0" when the meaning of the corresponding column is not included in the table. For example, it is assumed that $x_1$ corresponds to the meaning of the column "NAME". In this case, when the meaning of the column "NAME" is included in the target table, $x_1=1$, and when the meaning of the column "NAME" is not included in the target table, $x_1=0$. This is similarly applied to the other explanatory variables of $x_2$ to $x_n$. The table-meaning-model generation unit 4 determines the values of the explanatory variables of $x_1$ to $x_n$ for each table included in the learning data. The vector x in which the values of the explanatory variables of $x_1$ to $x_n$ are determined is referred to as a table feature.

The table-meaning model also includes the table-meaning set. FIG. 3 shows, as an example of the table-meaning set, a set of {customer table, item table, purchase log table, . . . } The number of meanings of tables belonging to the table-meaning set is "k".

$W=(w_1, w_2, w_3 \ldots, w_n)^T$ is determined for the meaning of each table belonging to the table-meaning set. W corresponding to the meaning of the j-th table is referred to as $W_j$. Since the number of meanings of tables is k, the k number of vectors W are determined. Also, the number of elements of W is the same as the number of elements of x, and is "n".

In addition, f(x) shown in FIG. 3 means, in the case in which a table is given and one meaning of the table is selected from the table-meaning set, the certainty that the selected meaning of the table corresponds to the meaning of the given table.

The table-meaning-model generation unit 4 determines the table feature for each table included in the learning data. The table-meaning-model generation unit 4 further generates a table-meaning model by determining, based on the correspondence relation between each table feature and the meaning of each table included in the learning data, the table-meaning set and W for the meaning of each table belonging to the table-meaning set. In the generated table-meaning model, the elements of x are represented by variables. On the other hand, the elements of W determined for the meaning of each table are specific values.

The table-meaning-model storage unit 5 is a storage device that stores the table-meaning model generated by the table-meaning-model generation unit 4. When generating a table-meaning model, the table-meaning-model generation unit 4 causes the table-meaning-model storage unit 5 to store the table-meaning model.

The table-meaning estimation unit 6 estimates the meaning of the table input to the data input unit 2 based on the table-meaning model stored in the table-meaning-model storage unit 5. The table-meaning estimation unit 6 determines the table feature according to the meaning of the column included in the input table. Then, the table-meaning estimation unit 6 sequentially selects the meaning of the table one by one from the table-meaning set, and calculates the certainty f(x) using W corresponding to the selected meaning of the table and the table feature.

That is, when the table feature is $X_{data}$, the table-meaning estimation unit 6 calculates the certainty f(x) with the expression of $W^T x_{data}$. The table-meaning estimation unit 6 determines the meaning of the table with the highest certainty as the estimation result of the meaning of the input table.

In the present exemplary embodiment, it will be described, as an example, a case in which a table-meaning model is represented as shown in FIG. 3 and the table-meaning estimation unit 6 estimates the meaning of the input table by the above calculation. However, the form of the table-meaning model is not limited to the form shown in FIG. 3. In addition, the table-meaning estimation unit 6 is only required to estimate the meaning of the input table by a calculation according to the form of the table-meaning model.

The display control unit 7 displays information and graphical user interfaces (GUI) on a display device (not shown in FIG. 1) included in the table-meaning estimation system 1.

When the table-meaning estimation unit 6 obtains the estimation result of the meaning of the input table, the display control unit 7 displays the input table and its estimation result on the display device. FIG. 4 is a schematic diagram showing an example of the screen displaying the input table and its estimation result. In the example shown in FIG. 4, the table-meaning estimation unit 6 displays the input table near the center of the screen. In addition, FIG. 4 exemplifies a case where "Customer Table" corresponding to the estimation result of the meaning of the table is displayed by displaying the sentence "Is the following table a customer table?".

The display control unit 7 also displays buttons 51 and 52 as the GUIs for a user to input whether the estimation result of the displayed meaning of the table is appropriate. Clicking the button 51 means that the user performs input indicating that the displayed meaning of the table is appropriate. On the other hand, clicking the button 52 means that the user performs input indicating that the displayed meaning of the table is not appropriate.

Figure 5:
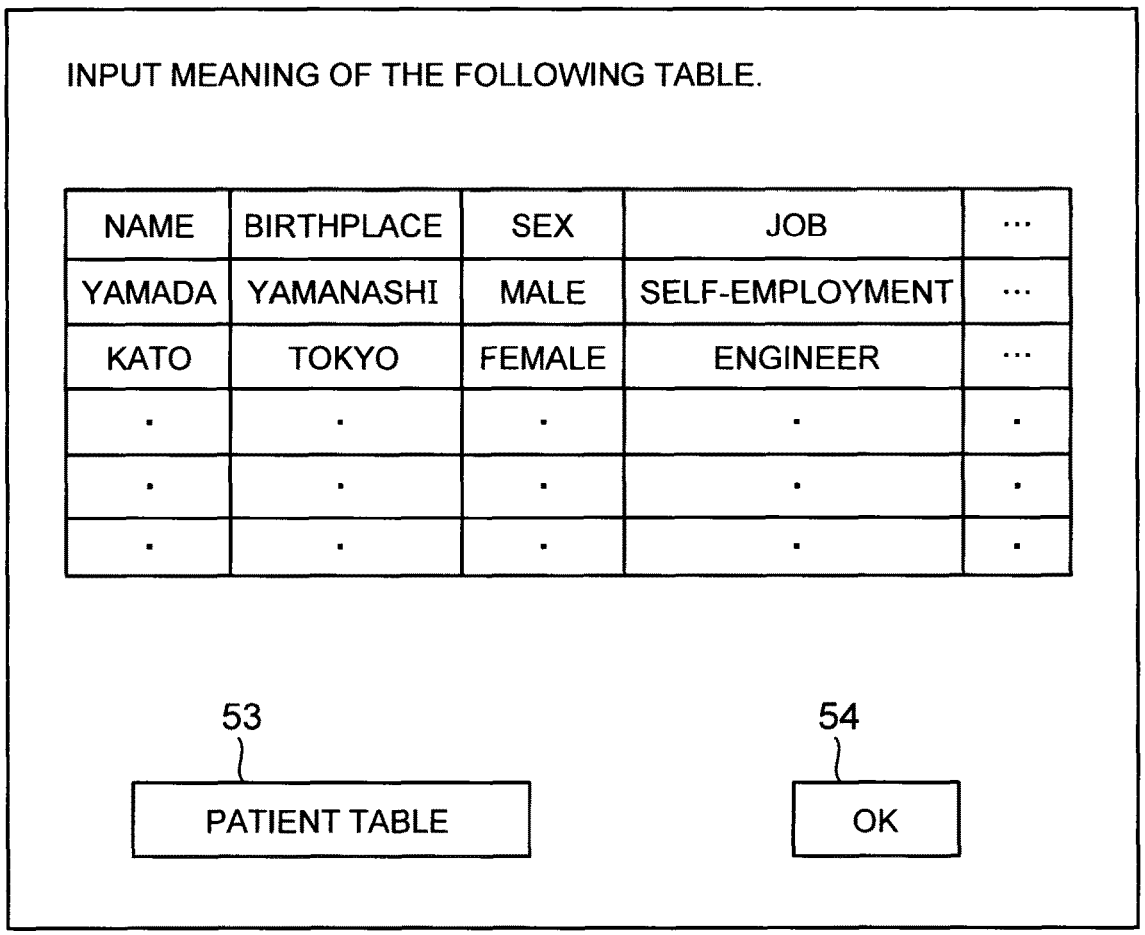
FIG. 5 It depicts a schematic diagram showing an example of a screen prompting input of an appropriate meaning of a table.

When the button 52 is clicked (that is, when the input indicating that the displayed meaning of the table is not appropriate is accepted), the display control unit 7 displays, on the display device, a screen prompting input of an appropriate meaning as the meaning of the table input to the data input unit 2. FIG. 5 is a schematic diagram showing an example of the screen.

The display control unit 7 displays the table input to the data input unit 2, and further displays an input field 53 and a confirmation button 54 as the GUIs for inputting the meaning of the table. The user inputs, to the input field 53, an appropriate meaning as the meaning of the displayed table (that is, the table input to the data input unit 2). FIG. 5 exemplifies a case in which the meaning "Patient Table" is input as the meaning of the table. When the user inputs the meaning of the table to the input field 53 and clicks the confirmation button 54, the display control unit 7 accepts the input of the meaning of the table via the input field 53.

In response to the input from the user, the learning-data addition unit 8 adds learning data to the existing learning data (that is, the learning data already stored in the learning-data storage unit 3).

Specifically, when the input indicating that the meaning of the table displayed on the screen shown in FIG. 4 is appropriate is performed, the learning-data addition unit 8 adds the combination of the table displayed by the display control unit 7 and the meaning of the table ("Customer Table" in the example shown in FIG. 4) as learning data to the existing learning data.

Alternatively, when the input indicating that the meaning of the table displayed on the screen shown in FIG. 4 is not appropriate is performed, the learning-data addition unit 8 adds the combination of the table displayed by the display control unit 7 and the meaning of the table accepted from the user by the display control unit 7 ("patient table" in the example shown in FIG. 5) to the existing learning data as the learning data.

When the learning-data addition unit 8 adds the learning data to the learning-data storage unit 3, the table-meaning-model generation unit 4 generates a table-meaning model again.

The table-meaning-model generation unit 4, the table-meaning estimation unit 6, the display control unit 7, and the learning-data addition unit 8 are implemented by, for example, a CPU of a computer operating in accordance with a table-meaning estimation program. In this case, the CPU is only required to load the table-meaning estimation program from a program recording medium such as a program storage device (not shown in FIG. 1) of the computer, and operate in accordance with the program as the table-meaning-model generation unit 4, the table-meaning estimation unit 6, the display control unit 7, and the learning-data addition unit 8. In addition, the table-meaning-model generation unit 4, the table-meaning estimation unit 6, the display control unit 7, and the learning-data addition unit 8 may be implemented by separate hardware. These points are similarly applied to other exemplary embodiments to be described later.

The table-meaning estimation system 1 may have a configuration in which two or more physically separated devices are connected wiredly or wirelessly. This is similarly applied to other exemplary embodiments to be described later.

The processing progress in the first exemplary embodiment of the present invention is described below.

Figure 6:
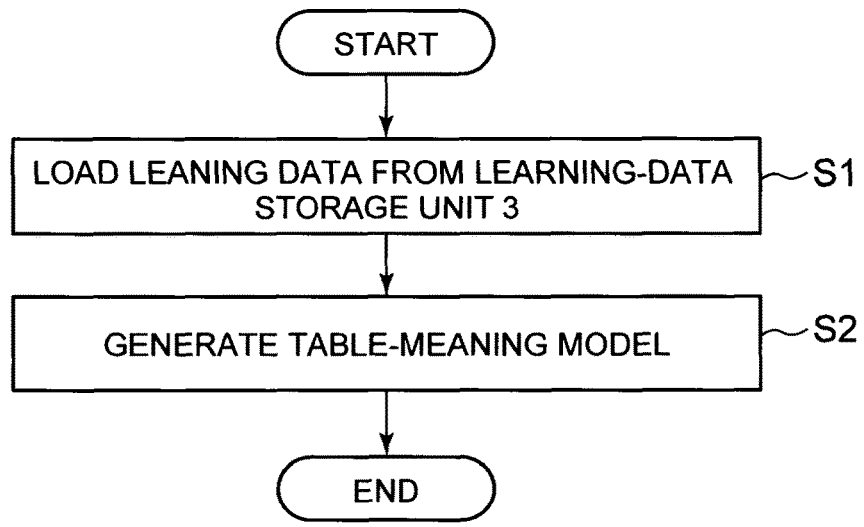
FIG. 6 It depicts a flowchart showing an example of processing progress in generating a table-meaning model.

The table-meaning estimation system 1 generates a table-meaning model in advance before accepting input of a table as a meaning estimation target. FIG. 6 is a flowchart showing an example of the processing progress in generating a table-meaning model.

It is assumed that a set of combinations of tables in which each column name is replaced with the meaning of the column and the meanings of the tables is stored in the learning-data storage unit 3 as learning data.

The table-meaning-model generation unit 4 loads the learning data from the learning-data storage unit 3 (step S1).

Next, the table-meaning-model generation unit 4 generates a table-meaning model based on the learning data (step S2).

In step S2, the table-meaning-model generation unit 4 determines the table feature for each table included in the learning data. Here, it will be described, as an example, a case of determining the table feature of the table exemplified in FIG. 2 among the tables included in the learning data. In the present exemplary embodiment, it is assumed that, in the elements of the vector x shown in FIG. 3, $x_1$ corresponds to "NAME", $x_2$ corresponds to "ITEM", $x_3$ corresponds to "BIRTHPLACE", $x_4$ corresponds to "SEX", $x_5$ corresponds to "JOB", and $x_6$ and subsequent elements correspond to meanings of other columns. The table shown in FIG. 2 includes "NAME", "BIRTHPLACE", "SEX" and "JOB" as the meanings of the columns, and does not include the meanings of other columns. Accordingly, $x_1=1$, $x_2=0$, $x_3=1$, $x_4=1$, and $x_5=1$. In addition, the values of the explanatory variables of $x_6$ to $x_n$ are "0". The table-meaning-model generation unit 4 determines an n-dimensional vector of $x=(1, 0, 1, 1, 1, 0, \ldots, 0)^T$ as the table feature of the table shown in FIG. 2. As a result, a combination of the table feature $x=(1, 0, 1, 1, 1, 0, \ldots, 0)^T$ and the meaning of the table "Customer Table" is determined.

The table-meaning-model generation unit 4 similarly determines the table feature for each of the other tables included in the learning data, and determines a combination of the table feature and the meaning of the table.

Then, the table-meaning-model generation unit 4 determines, based on the set of combinations of the table features and the meanings of the tables, a table-meaning set and the vector W in the expression of $f(x)=W^T x$ for the meaning of each table belonging to the table-meaning set. As a result, the table-meaning model is determined. As already described, the elements of x in the table-meaning model are represented by variables. On the other hand, the elements of W determined for the meaning of each table are specific values.

The table-meaning-model generation unit 4 causes the table-meaning-model storage unit 5 to store the generated table-meaning model.

Figure 7:
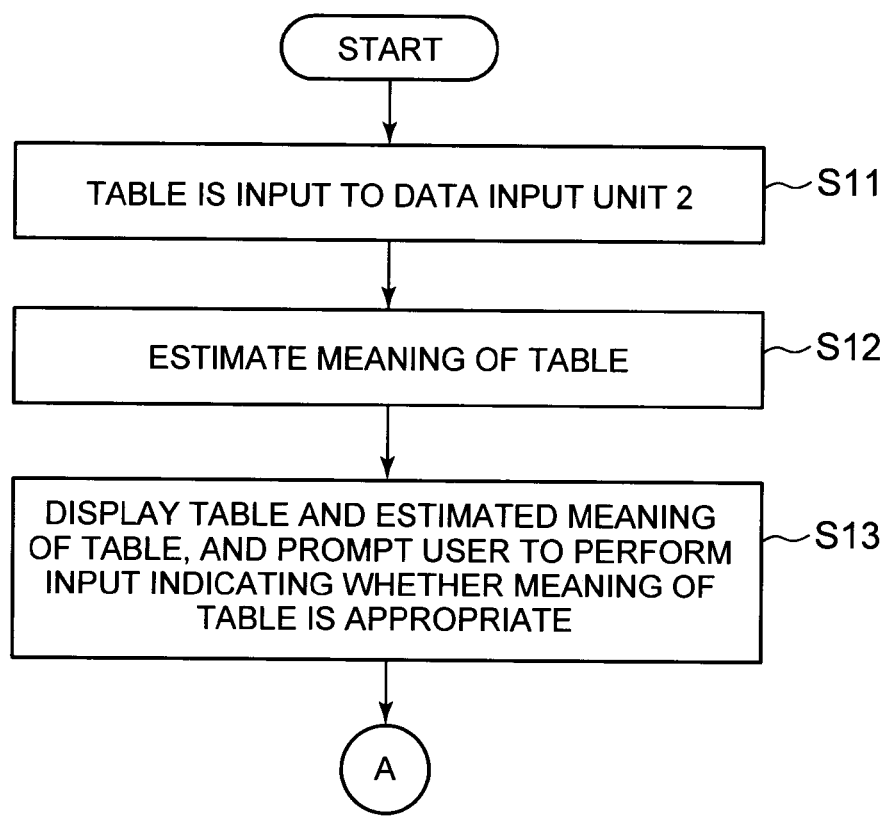
FIG. 7 It depicts a flowchart showing an example of processing progress when a table as a meaning estimation target is input.
Figures 8, 9:
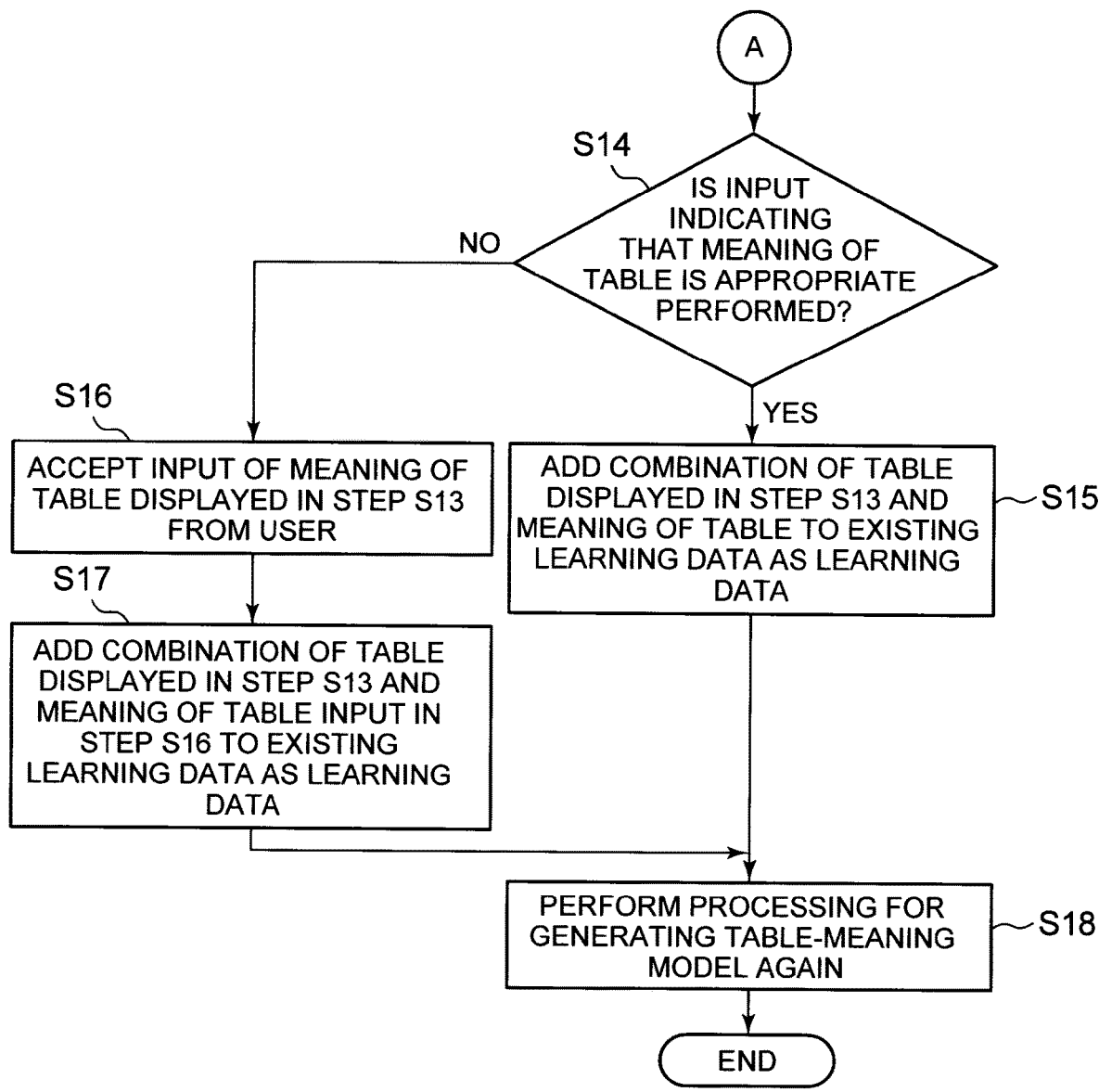
FIG. 8 It depicts a flowchart showing an example of processing progress when a table as a meaning estimation target is input.
FIG. 9 It depicts a schematic diagram showing an example of a table to be input.

Next, the processing progress when a table as a meaning estimation target is input to the table-meaning estimation system 1 is described. FIG. 7 and FIG. 8 are flowcharts showing an example of processing progress when a table as a meaning estimation target is input.

First, a table is input to the data input unit 2 (step S11). In step S11, a table in which processing for replacing each column name with the meaning of the column is input. Here, it is described, as an example, a case in which the table shown in FIG. 9 is input.

Next, the table-meaning estimation unit 6 estimates the meaning of the table input in step S11 based on the table-meaning model (step S12).

In step S12, the table-meaning estimation unit 6 loads the table-meaning model from the table-meaning-model storage unit 5.

The table-meaning estimation unit 6 further determines the table feature of the input table. As already described, in the present exemplary embodiment, it is assumed that, in the elements of the vector x shown in FIG. 3, $x_1$ corresponds to "NAME", $x_2$ corresponds to "ITEM", $x_3$ corresponds to "BIRTHPLACE", $x_4$ corresponds to "SEX", $x_5$ corresponds to "JOB", and $x_6$ and subsequent elements correspond to meanings of other columns. Accordingly, in the table shown in FIG. 9, $x_1=1$, $x_2=0$, $x_3=1$, $x_4=1$, and $x_5=1$. Similarly, the table-meaning estimation unit 6 determines the values of the explanatory variables of $x_6$ to $x_n$ according to the meanings of the fifth columns and subsequent columns, and determines an n-dimensional vector of $x=(1, 0, 1, 1, 1, \ldots)^T$ as a table feature of the table shown in FIG. 9. This table feature is $X_{data}$.

Then, the table-meaning estimation unit 6 sequentially selects the meaning of the table one by one from the table-meaning set, and calculates the certainty $f(x)$ using W corresponding to the selected meaning of the table and the table feature. As already described, W corresponding to the meaning of the j-th table is referred to as $W_j$. When selecting the meaning of the first table "Customer Table" shown in FIG. 3, the table-meaning estimation unit 6 calculates the certainty that "Customer Table" is the meaning of the input table using $W_1$ corresponding to "Customer Table" and the table feature $x_{data}$ with the expression of $f(x)=W_1^T x_{data}$. The table-meaning estimation unit 6 performs similar calculation for the meanings of other tables such as "Item Table" and "Purchase Log Table" (see FIG. 3), and calculates the certainty that the selected meaning of the table corresponds to the meaning of the input table.

Then, the table-meaning estimation unit 6 determines the meaning of the table with the highest certainty as the estimation result of the meaning of the input table.

In the following description, it is described, as an example, a case in which the table-meaning estimation unit 6 estimates that the meaning of the input table is "Customer Table" with the above processing.

After the processing in step S12 is performed, the display control unit 7 displays the table input in step S11 and the meaning of the table estimated in step S12 on the display device, and prompts the user to perform input indicating whether the meaning of the table is appropriate (step S13). In step S13, the display control unit 7 displays, for example, the screen shown in FIG. 4. The screen shown in FIG. 4 has been described, and the description is omitted as appropriate.

The table displayed on the screen exemplified in FIG. 4 is the table input in step S11 (the table as the meaning estimation target). "Customer Table" displayed on the screen exemplified in FIG. 4 is the meaning of the table estimated in step S12.

When the user determines that the meaning of the table "Customer Table" displayed in step S13 is appropriate as the meaning of the table in the screen displayed in step S13, the user clicks the button 51 (see FIG. 4). That is, the display control unit 7 accepts the input indicating that the displayed meaning of the table is appropriate (Yes in step S14).

Then, the learning-data addition unit 8 adds, to the existing learning data, the combination of the table displayed by the display control unit 7 in step S13 and the meaning of the table (the estimated meaning of the table) (step S15). That is, the learning-data addition unit 8 adds the combination of the table and the estimated meaning of the table to the learning data stored in the learning-data storage unit 3. After the processing in step S15 is performed, the processing proceeds to step S18.

Alternatively, when the user determines that the meaning of the table "Customer Table" displayed in step S13 is not appropriate as the meaning of the table in the screen displayed in step S13, the user clicks the button 52 (see FIG. 4). The display control unit 7 accepts the input indicating that the displayed meaning of the table is not appropriate (No in step S14).

Then, the display control unit 7 accepts the input of the meaning of the table displayed in step S13 from the user (step S16). For example, the display control unit 7 displays the screen shown in FIG. 5. The screen shown in FIG. 5 has been described, and the description is omitted as appropriate. The display control unit 7 accepts the input of the meaning of the table from the user via, for example, the input field 53 (see FIG. 5). Here, it is assumed that the user determines that "Patient Table" is appropriate as the meaning of the table displayed in step S13, and inputs "Patient Table".

Next, the learning-data addition unit 8 adds, to the existing learning data, the combination of the table displayed by the display control unit 7 in step S13 and the meaning of the table input in step S16 (in this example, "Patient Table") (step S17). That is, the learning-data addition unit 8 adds the combination of the table and the meaning of the table input by the user (in this example, "Patient Table") to the learning data stored in the learning-data storage unit 3. After the processing in step S17 is performed, the processing proceeds to step S18.

In both steps S15 and S17, new learning data is added to the learning data. In the case of shifting from step S15 or S17 to step S18, the table-meaning-model generation unit 4 performs the processing for generating the table-meaning model again based on the learning data stored in the learning-data storage unit 3 at that time (step S18). In other words, the table-meaning-model generation unit 4 learns a table-meaning model again using the existing learning data and the added learning data.

According to the present exemplary embodiment, the table-meaning-model generation unit 4 generates an estimation model (table-meaning model) for estimating the meaning of the table from the meaning of a column in the table. Then, the table-meaning estimation unit 6 estimates the meaning of the table based on the meaning of the column in the input table and the table-meaning model. Thus, according to the present exemplary embodiment, it is possible to estimate the meaning of the table.

Accordingly, it is possible for, for example, a person who intends to perform automatic analysis using a typical analysis pattern to grasp the meaning of the table to be used in the analysis in a short time.

Furthermore, when, for example, a database migration work is performed and a worker different from a worker using the database before the migration uses the table after the migration, it is possible for the worker to grasp the meaning of the table after the migration in a short time and to smoothly use the database after the migration.

According to the first exemplary embodiment, the user determines whether the meaning of the table estimated by the table-meaning estimation unit 6 is appropriate. Then, when it is determined that the meaning of the table is appropriate, the learning-data addition unit 8 adds, to the learning data, the combination of the table input in step S11 and the meaning of the table estimated by the table-meaning estimation unit 6. Alternatively, when it is determined that the estimated meaning of the table is not appropriate, the display control unit 7 accepts the input indicating an appropriate meaning as the meaning of the table input in step S11 from the user, and the learning-data addition unit 8 adds, to the learning data, the combination of the table input in step S11 and the meaning of the table input by the user. Then, the table-meaning-model generation unit 4 generates a table-meaning model again. Thus, it is possible to improve the accuracy of the table-meaning model. Especially, when it is determined that the meaning of the table estimated by the table-meaning estimation unit 6 is not appropriate, the meaning of the table determined to be appropriate by the user is added to the learning data, and the accuracy of the table-meaning model is effectively improved.

Furthermore, the table-meaning-model generation unit 4 may calculate the certainty of estimation for each table in the learning data by learning the table-meaning model sequentially. At that time, the table-meaning-model generation unit 4 may perform learning processing in order from a table with lower certainty of estimation. In that case, it is possible to achieve sufficient estimation accuracy before performing learning processing from all tables.

Figure 10:
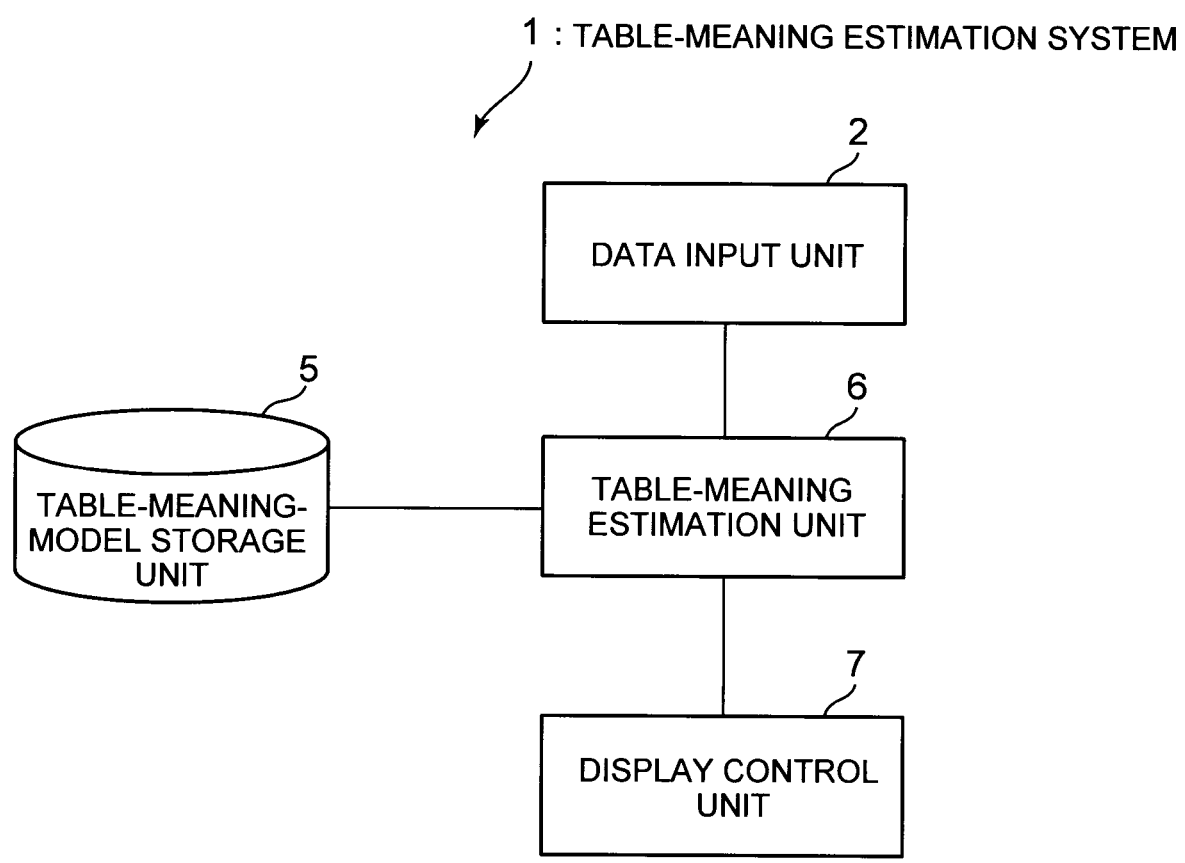
FIG. 10 It depicts a block diagram showing a configuration example when the table-meaning estimation system does not generate a table-meaning model.

Next, a modification of the first exemplary embodiment is described. In the first exemplary embodiment, it has been described the case in which the table-meaning estimation system 1 generates a table-meaning model and estimates the meaning of an input table. Another system different from the table-meaning estimation system 1 (not shown and hereinafter, referred to as a learning system) may generate a table-meaning model, and the table-meaning estimation system 1 may not generate a table-meaning model. FIG. 10 is a block diagram showing a configuration example when the table-meaning estimation system 1 does not generate a table-meaning model. In this case, the learning-data storage unit 3 and the table-meaning-model generation unit 4 (see FIG. 1) are provided in the learning system. The learning-data storage unit 3 and the table-meaning-model generation unit 4 provided in the learning system are similar to those shown in FIG. 1. As shown in, for example, FIG. 10, the table-meaning estimation system 1 includes the data input unit 2, the table-meaning-model storage unit 5, the table-meaning estimation unit 6, and the display control unit 7. The data input unit 2, the table-meaning-model storage unit 5, and the table-meaning estimation unit 6 are similar to those shown in FIG. 1. However, the table-meaning-model storage unit 5 stores a table-meaning model generated by the learning system. Since the learning system performs the processing in steps S1 and S2 (see FIG. 6), the table-meaning estimation system 1 shown in FIG. 10 does not need to perform the processing in steps S1 and S2. Furthermore, after the processing in step S12 is performed, the display control unit 7 is only required to display the table input in step S11 and the meaning of the table estimated in step S12. At this time, the display control unit 7 does not need to display the buttons S1 and S2. Then, the table-meaning estimation system 1 displays the input table and the estimated meaning of the table, and may terminate the processing at that point.

Second Exemplary Embodiment

Figure 11:
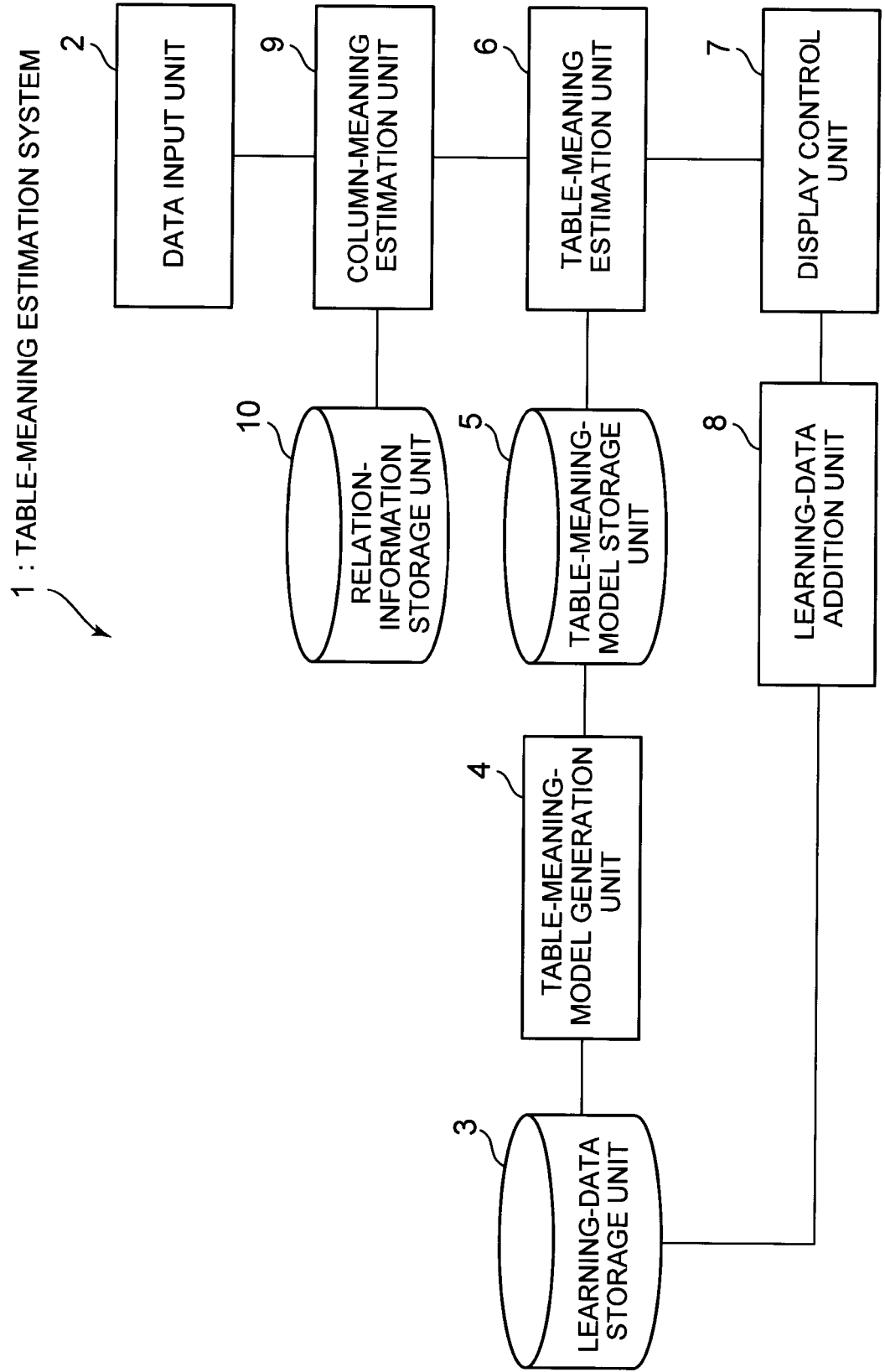
FIG. 11 It depicts a block diagram showing a configuration example of a table-meaning estimation system in a second exemplary embodiment of the present invention.

FIG. 11 is a block diagram showing a configuration example of a table-meaning estimation system in a second exemplary embodiment of the present invention. The constituent elements similar to those of the table-meaning estimation system 1 (see FIG. 1) in the first exemplary embodiment are denoted by the same reference signs as those in FIG. 1, and description thereof is omitted as appropriate. A table-meaning estimation system 1 in the second exemplary embodiment includes a column-meaning estimation unit 9 and a relation-information storage unit 10 in addition to the constituent elements of the table-meaning estimation system 1 in the first exemplary embodiment.

In the first exemplary embodiment, a table in which each column name is replaced with the meaning of the column is input to the data input unit 2. In contrast, in the second exemplary embodiment, a table in which such replacement is not performed is input to a data input unit 2. That is, a table containing the column names originally assigned at the time of creating the table is input to the data input unit 2.

The relation-information storage unit 10 is a storage device that stores relation information. The relation information is data indicating the relation between "the meaning of a column" and "an attribute value". The column-meaning estimation unit 9 refers to the relation information to estimate the meaning of each column in the input table. The relation-information storage unit 10 stores, for example, predetermined relation information.

FIG. 12 is a schematic diagram showing an example of the relation information stored in the relation-information storage unit 10. In the present exemplary embodiment, it is assumed that the individual relation information is expressed in the form of "A is B". Specifically, the individual relation information is expressed in the form of "the meaning of a column is an attribute value". "The meaning of a column is an attribute value" means that the meaning of the column and the attribute value are associated with each other. For example, "NAME is SATO" shown in FIG. 12 indicates that the attribute value "SATO" corresponds to the meaning of the column "NAME". Also, for example, "SEX is MALE" indicates that the attribute value "MALE" corresponds to the meaning of the column "SEX".

By using the relation information, it is possible to estimate the meaning of the column containing the attribute value.

The column-meaning estimation unit 9 estimates the meaning of a column for each column in the table input to the data input unit 2, and replaces the column name with the meaning of the column.

The column-meaning estimation unit 9 estimates the meaning of one column by performing, for example, the following processing to the column. The column-meaning estimation unit 9 specifies the corresponding "meaning of a column" for each attribute value in the column by referring to the relation information. At this time, all the attribute values in one column are not associated with the same "meaning of the column". Thus, as a result of specifying the meaning of the column for each attribute value, a plurality of meanings of the column may be obtained. The column-meaning estimation unit 9 counts the number of corresponding attribute values for each specified meaning of the column, and sets the meaning of the column having the maximum number of corresponding attribute values as the estimation result of the meaning of the column. For example, it is assumed that the column contains 100 attribute values and 95 attribute values among them correspond to the meaning of the column "NAME", and that the remaining 5 attribute values correspond to the meaning of the column "BIRTHPLACE". In this case, the column-meaning estimation unit 9 estimates that the meaning of the column is "NAME". The column-meaning estimation unit 9 further replaces the column name of the column with the estimated meaning of the column (in this example, "NAME").

The column-meaning estimation unit 9 performs the above processing to each column in the input table.

The column-meaning estimation unit 9 transmits the table in which each column name is replaced with the meaning of the column to the table-meaning estimation unit 6.

A learning-data storage unit 3, a table-meaning-model generation unit 4, a table-meaning-model storage unit 5, a table-meaning estimation unit 6, a display control unit 7, and a learning-data addition unit 8 are similar to those in the first exemplary embodiment.

The column-meaning estimation unit 9 is implemented by, for example, a CPU of a computer operating in accordance with a table-meaning estimation program.

The processing progress in the second exemplary embodiment of the present invention is described below.

The operation of the table-meaning estimation system 1 to generate a table-meaning model is similar to the operation described in the first exemplary embodiment (see FIG. 6), and the description thereof is omitted.

Figures 13, 14:
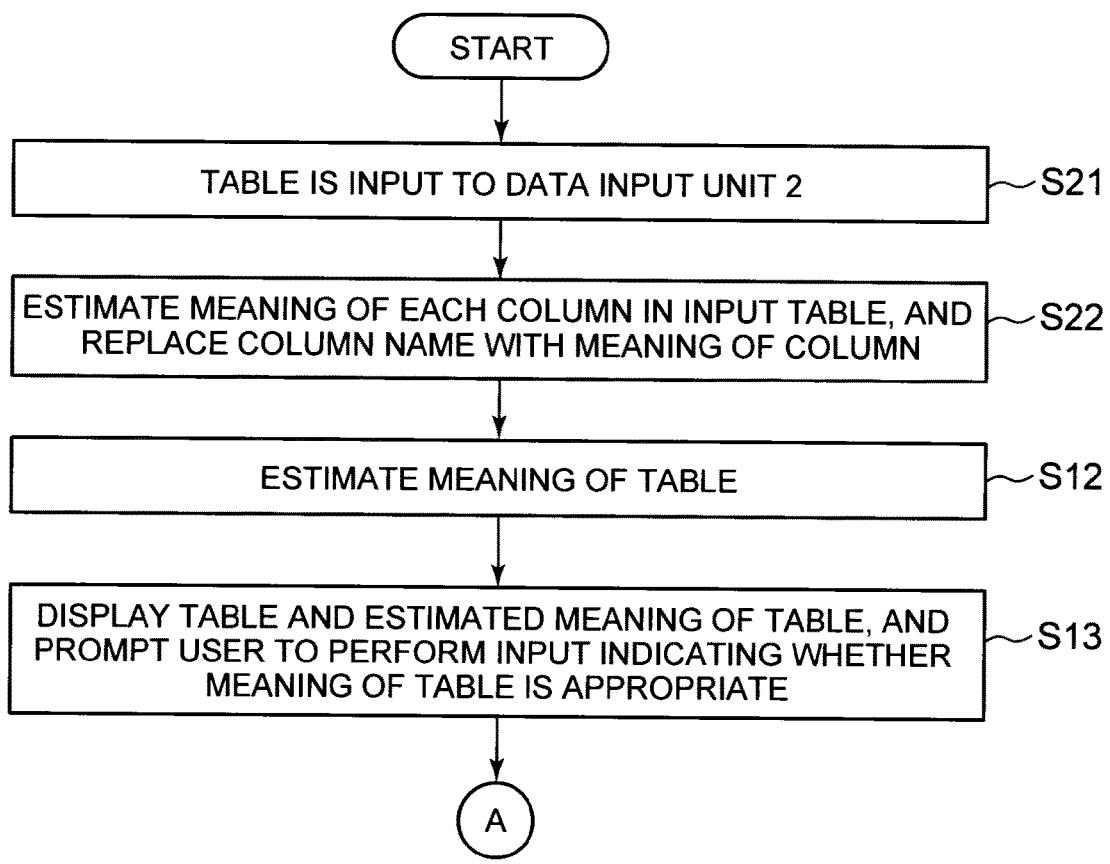
FIG. 13 It depicts a flowchart showing an example of processing progress when a table as a meaning estimation target is input.
FIG. 14 It depicts a schematic diagram showing an example of a table to be input.

FIG. 13 is a flowchart showing an example of processing progress when a table as a meaning estimation target is input. Note that, since the processing in step S12 and subsequent steps is similar to the processing in step S12 and subsequent steps in the first exemplary embodiment and steps S14 to S18 are shown in FIG. 8, the illustration of steps S14 to S18 is omitted.

First, a table is input to the data input unit 2 (step S21). In the second exemplary embodiment, a table containing the column names originally assigned at the time of creating the table is input to the data input unit 2. Here, it is described, as an example, a case in which the table shown in FIG. 14 is input. "CUSTOMER NAME", "PREFECTURE", "TYPE", "WORK", and the like shown in FIG. 14 are column names.

Next, the column-meaning estimation unit 9 estimates the meaning of the column for each column in the input table, and replaces the column name with the meaning of the column. (step S22). The operation of the column-meaning estimation unit 9 to estimate the meaning of the column has been described, and the description thereof is omitted here.

In step S22, it is assumed that the table shown in FIG. 9 is obtained since each column name shown in FIG. 14 is replaced with the meaning of the column. That is, it is assumed that the column names of "CUSTOMER NAME", "PREFECTURE", "TYPE", "WORK", and the like (see FIG. 14) are respectively replaced with the meanings "NAME", "BIRTHPLACE", "SEX", "JOB", and the like of the columns. The column-meaning estimation unit 9 transmits the table after replacing each column name with the meaning of the column (in this example, the table shown in FIG. 9) to the table-meaning estimation unit 6.

The subsequent processing is similar to the processing in step S12 and subsequent steps in the first exemplary embodiment. However, in step S12, the table-meaning estimation unit 6 estimates the meaning of the table using the table to which the processing for replacing each column name with the meaning of the column is performed in step S22.

In addition, when the table is displayed in step S13 (see FIG. 13) or step S16 (see FIG. 8), the display control unit 7 displays the table to which the processing for replacing each column name with the meaning of the column is performed in step S22.

Also in the second exemplary embodiment, effects similar to those of the first exemplary embodiment can be obtained.

In the second exemplary embodiment, the column-meaning estimation unit 9 estimates the meaning of the column for each column in the input table, and replaces the column name with the meaning of the column. Thus, the table to be input to the data input unit 2 does not need to be a table to which pre-processing for replacing each column name with the meaning of the column is performed. That is, the user is only required to input, to the data input unit 2, a table containing the originally assigned column names.

Furthermore, it is considered that the table-meaning estimation unit 6 estimates the meaning of the table directly using the table containing the originally assigned column names. As described above, generally, column names are determined by humans, and notation variants occur in column names. Thus, it is difficult to determine the number of column names to be finite. The number of the meanings of a column is finite (n-number), and the number of each of the elements of W and the number of elements of x is "n" in the table-meaning model shown in FIG. 3. When a column name is used instead of the meaning of a table, it is difficult to determine the number of column names to be finite, and it is also difficult to generate the table-meaning model shown in FIG. 3. As a result, the table-meaning estimation unit 6 cannot estimate the meaning of the table. In contrast, in the second exemplary embodiment, the column-meaning estimation unit 9 estimates the meaning of the column for each column in the input table, and replaces the column name with the meaning of the column. Thus, the table-meaning estimation unit 6 can estimate the meaning of the table.

If the number of column names can be determined to be finite and the table-meaning model shown in FIG. 3 can be generated, the number of column names becomes enormous as compared with the number of meanings of columns. Thus, the number of elements of the vectors W and x (the number of dimensions) in the table-meaning model also becomes enormous. Then, the processing load of the processing of the table-meaning-model generation unit 4 to generate the table-meaning model and the processing of the table-meaning estimation unit 6 to estimate the meaning of the table increases enormously. In the second exemplary embodiment, since the column-meaning estimation unit 9 estimates the meaning of the column for each column in the input table and replaces the column name with the meaning of the column, it is possible to prevent the processing load from increasing.

Next, a modification of the second exemplary embodiment is described.

Figure 15:
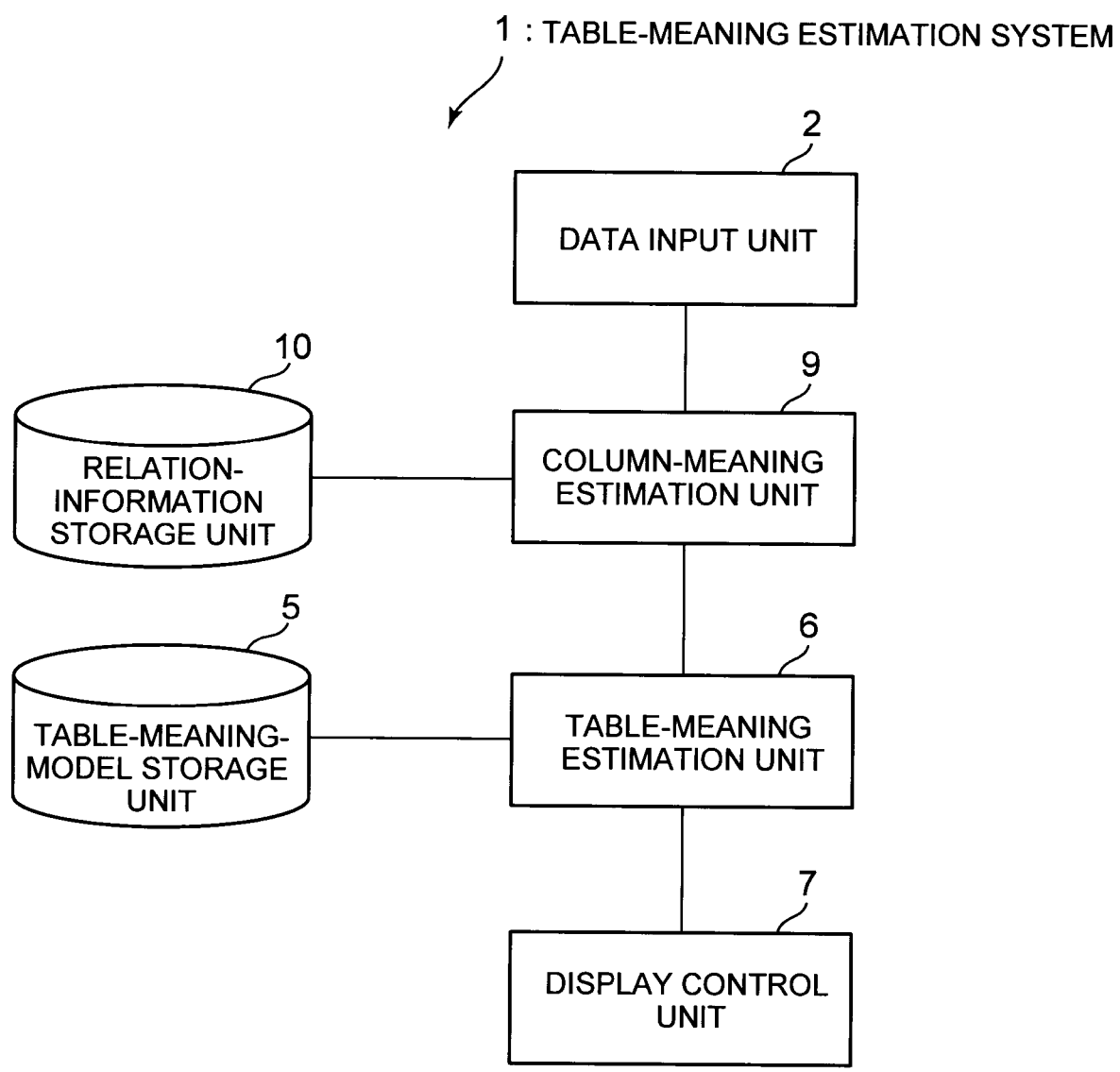
FIG. 15 It depicts a block diagram showing a configuration example when the table-meaning estimation system does not generate a table-meaning model.

Similarly to the modification of the first exemplary embodiment, a learning system (not shown) different from the table-meaning estimation system 1 may generate a table-meaning model, and the table-meaning estimation system 1 may not generate a table-meaning model. FIG. 15 is a block diagram showing a configuration example when the table-meaning estimation system 1 does not generate a table-meaning model. The data input unit 2, the relation-information storage unit 10, the column-meaning estimation unit 9, the table-meaning-model storage unit 5, and the table-meaning estimation unit 6 are similar to those shown in FIG. 11. The table-meaning-model storage unit 5 stores the table-meaning model generated by the learning system. Furthermore, after the processing in step S12 is performed, the display control unit 7 is only required to display the table in which the column name is replaced with the meaning of the column in step S22 and the meaning of the table estimated in step S12. At this time, the display control unit 7 may not display the buttons 51 and 52 (see FIG. 4). Then, the table-meaning estimation system 1 may terminate the processing at the time when displaying the table and the meaning of the table.

In addition, in the second exemplary embodiment, in order to generate learning data, the user may input, to the table-meaning estimation system 1, a set of combinations of tables containing the column names originally assigned at the time of creating the tables and the meanings of the tables. At this time, the column-meaning estimation unit 9 may estimate the meaning of the column for each column in the input table, perform processing for replacing the column name with the meaning of the column, and cause the learning-data storage unit 3 to store the set of combinations of the tables after the processing and the meanings of the tables as learning data.

Figure 16:
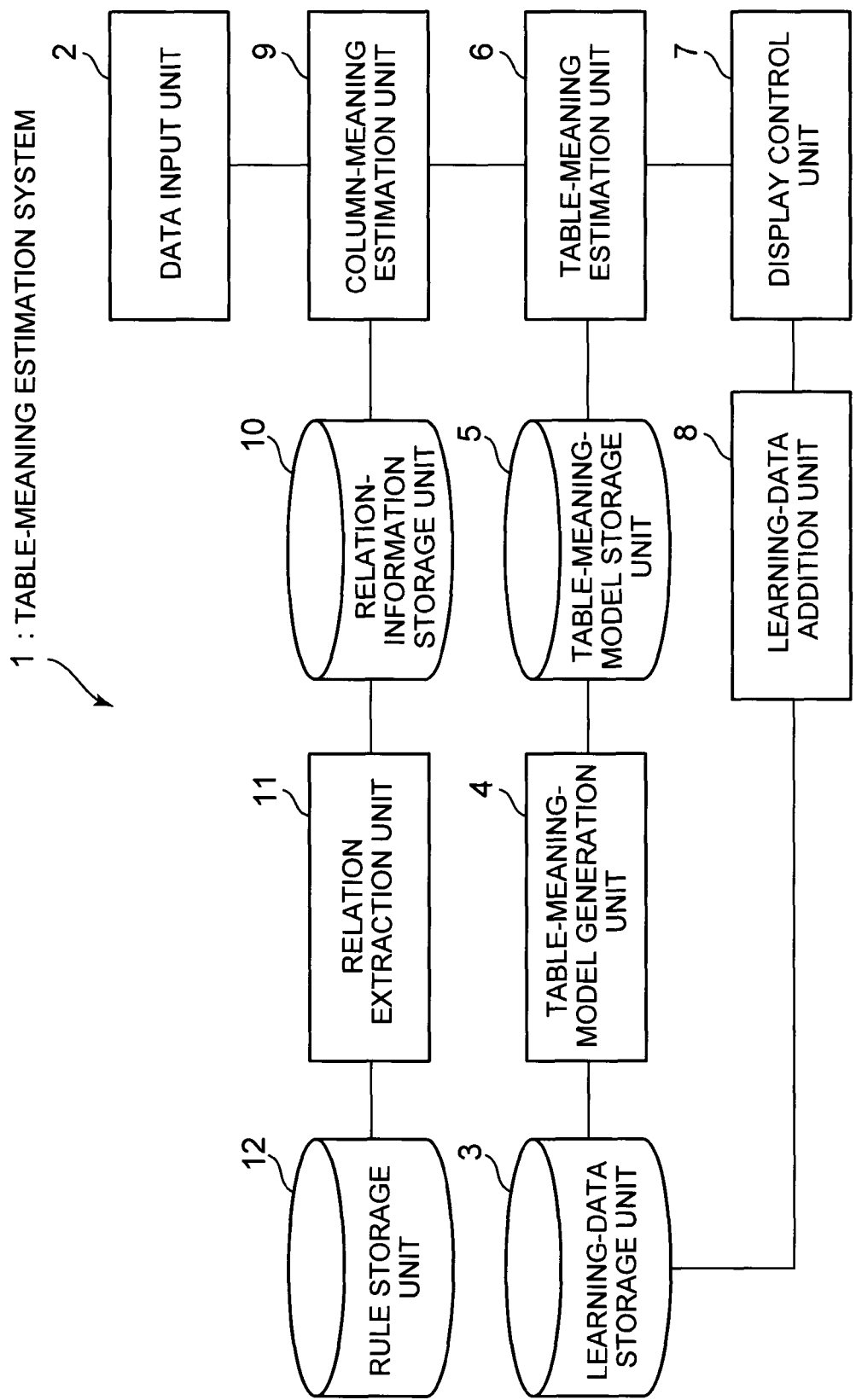
FIG. 16 It depicts a block diagram showing a configuration example when the table-meaning estimation system generates relation information.

Furthermore, the table-meaning estimation system 1 may generate relation information. FIG. 16 is a block diagram showing a configuration example when the table-meaning estimation system 1 generates relation information. The constituent elements similar to those of the second exemplary embodiment are denoted by the same reference signs as those in FIG. 11, and description thereof is omitted. The table-meaning estimation system 1 shown in FIG. 16 includes a relation extraction unit 11 and a rule storage unit 12 in addition to the constituent elements of the table-meaning estimation system 1 in the second exemplary embodiment (see FIG. 11).

For example, text data such as a specification is input to the relation extraction unit 11. The type of text data to be input to the relation extraction unit 11 is not particularly limited. The rule storage unit 12 is a storage device that stores rules for extracting the relation information from text data. The relation extraction unit 11 extracts the relation information from the text data in accordance with the rules and causes the relation-information storage unit 10 to store the extracted relation information. The method for extracting relation information from text data in accordance with given rules may be a known method.

The relation extraction unit 11 is implemented by, for example, a CPU of a computer operating in accordance with a table-meaning estimation program.

According to the configuration shown in FIG. 16, it is possible for the user to reduce the burden of the work for creating the relation information.

In the first and second exemplary embodiments, the number of elements of each of the vectors x and W in $f(x)=W^T x$ may be set according to the meaning of the table. The following is described as a modification of the first exemplary embodiment, but the configuration and operation described below may be applied to the second exemplary embodiment.

Figure 17:
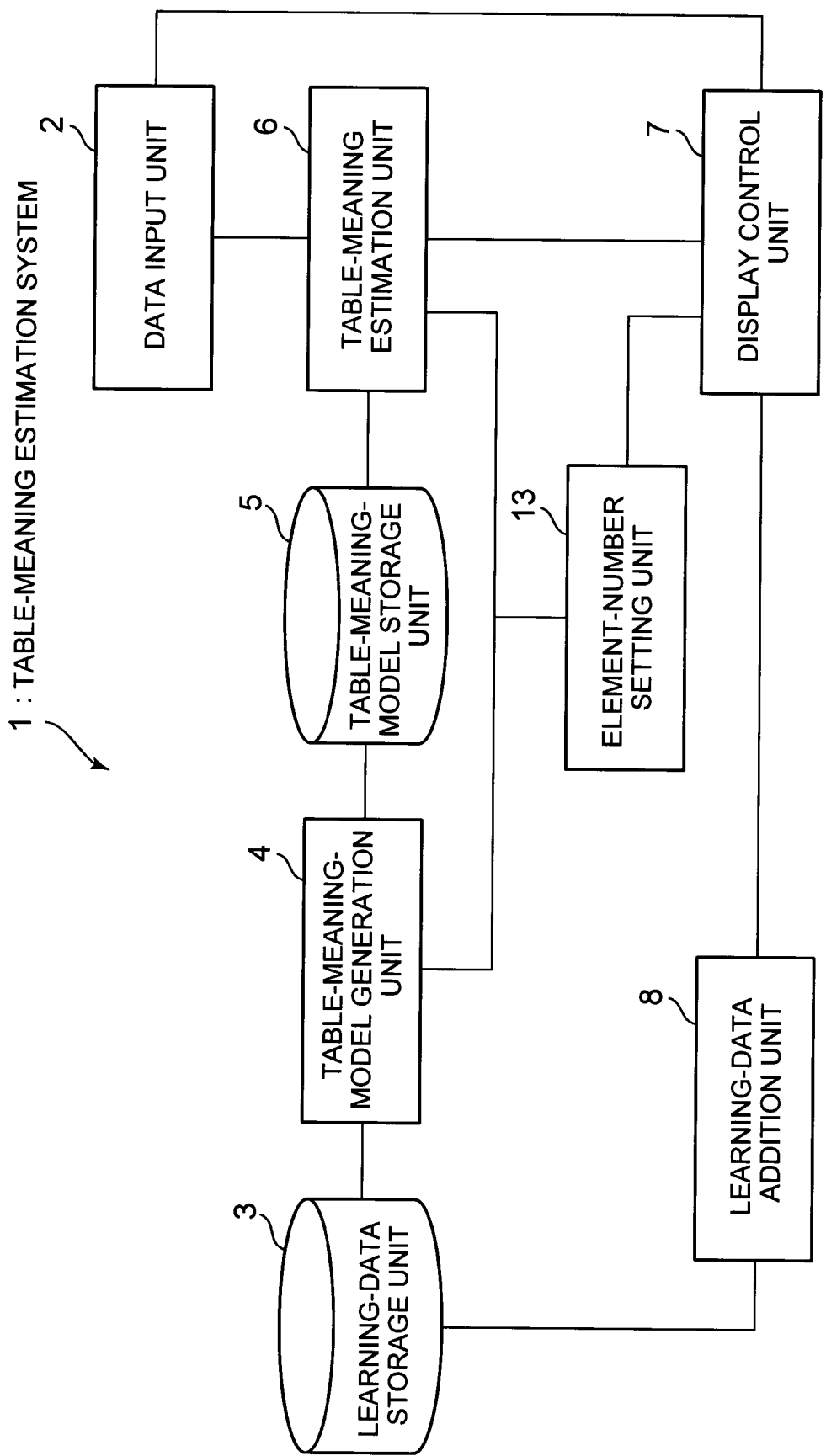
FIG. 17 It depicts a block diagram showing a configuration example in which the number of elements of each of vectors x and W can be set according to the meaning of a table.

FIG. 17 is a block diagram showing a configuration example in which the number of elements of each of the vectors x and W can be set according to the meaning of a table. The constituent elements similar to those in the first exemplary embodiment are denoted by the same reference signs as those in FIG. 1, and description thereof is omitted. The table-meaning estimation system 1 shown in FIG. 17 includes an element-number setting unit 13 in addition to the constituent elements of the table-meaning estimation system 1 in the first exemplary embodiment (see FIG. 1).

The operation for setting the number of elements of each of the vectors x and W according to the meaning of a table is performed before generation of a table-meaning model. The table-meaning estimation system 1 starts this operation, for example, in response to an instruction input via a GUI from the user.

After the operation for setting the number of elements of each of x and W according to the meaning of a table is started, a table is input to the data input unit 2. This table is a table to which pre-processing for replacing each column name with the meaning of the column has been performed.

When the table is input, the display control unit 7 displays, on the display, the table, an input field of the meaning of the table, and check boxes corresponding to the columns in the table on a one-to-one basis. FIG. 18 is an explanatory diagram showing an example of a screen including the table, the input field of the meaning of the table, and the check boxes. A table 61 is the input table. An input field 62 is an input field to which the meaning of the table 61 is input. The display control unit 7 displays the check boxes as many as the number of the columns in the table 61 as check boxes 63. A determination button 64 is a button for the user to perform input indicating that input to the input field 62 and check to the check box 63 have been completed. As shown in FIG. 18, the display control unit 7 also displays a message prompting input of the meaning of the table 61 and a message prompting selection of characteristic columns representing the meaning of the table 61.

The user inputs the meaning of the table 61 to the input field 62 according to the message. In addition, the user checks a check box corresponding to the characteristic column representing the meaning of the table 61, and does not check any other check boxes.

Thereafter, when the determination button 64 is clicked, the display control unit 7 transmits, to the number-of-elements setting unit 13, the meaning of the table 61 input to the input field 62 and the meaning of the column corresponding to the checked check box. When the input exemplified in FIG. 18 is performed, the display control unit 7 transmits the meaning of the table "Customer Table" and the meanings of the three columns of "NAME", "SEX", and "JOB" to the number-of-elements setting unit 13.

The element-number setting unit 13 sets the number of elements of W and x in $f(x)=W^T x$ used when the certainty on the meaning of the table is calculated to the number of meanings of columns transmitted from the display control unit 7 (in other words, the number of the checked check boxes). The element-number setting unit 13 further sets explanatory variables as the elements of x to the explanatory variables corresponding to the meanings of the columns transmitted from the display control unit 7. For example, it is assumed that $x_1$ corresponds to "NAME", $x_4$ corresponds to "SEX", and $x_5$ corresponds to "JOB". In this example, the element-number setting unit 13 sets x in $f(x)=W^T x$ used when the certainty on the "Customer Table" is calculated as a vector having three explanatory variables $x=(x_1, x_4, x_5)^T$ as the elements. The element-number setting unit 13 further sets the number of elements of W to "3". The element-number setting unit 13 notifies the table-meaning-model generation unit 4 and the table-meaning estimation unit 6 of the setting result.

When accepting the notification, the table-meaning-model generation unit 4 sets x in $f(x)=W^T x$ used when the certainty on the "Customer Table" is calculated as a vector having three explanatory variables $x=(x_1, x_4, x_5)^T$ as the elements, sets the number of elements of W as "3", and generates a table-meaning model.

When accepting the notification from the element-number setting unit 13, the table-meaning estimation unit 6 selects "Customer Table" from the table-meaning set and derives the table feature $X_{data}$ by setting the values of the three explanatory variables which are the elements of $x=(x_1, x_4, x_5)^T$ when calculating the certainty on "Customer Table". Then, the table-meaning estimation unit 6 calculates $W^T x_{data}$ using W corresponding to "Customer Table" and its $x_{data}$ to calculate the certainty that "Customer Table" is the meaning of the table to be estimated. Since the number of elements of W corresponding to "Customer Table" is three, $W^T x_{data}$ can be calculated.

In the above example, it has been described the case of setting the number of elements of each of x and W corresponding to the meaning of the table "Customer Table". The table-meaning estimation system 1 shown in FIG. 17 may perform similar setting operation for x and W corresponding to a meaning of another table according to the input from the user. With regard to the meaning of the table which is not designated by the user, the number of each of the elements of x and W is set to the default value. This default value is the number (n-number) of meanings of columns in the set of meanings of columns.

Third Exemplary Embodiment

In a third exemplary embodiment, it is premised that a table name is assigned to a table as a meaning estimation target. A table-meaning estimation system in the third exemplary embodiment estimates the meaning of a table based on an assigned table name and a table-meaning model.

The table-meaning estimation system in the third exemplary embodiment can be represented by the block diagram shown in FIG. 1 similarly to the table-meaning estimation system in the first exemplary embodiment, and the third exemplary embodiment is described with reference to FIG. 1. Description similar to the first exemplary embodiment will be omitted as appropriate.

In the third exemplary embodiment, a table name of a table as a meaning estimation target is input to a data input unit 2. In the following description, it is assumed that a table to which a table name is assigned is input to the data input unit 2.

The table-meaning model in the present exemplary embodiment is an estimation model for estimating the meaning of the table from the table name. A learning-data storage unit 3 stores learning data used for learning the table-meaning model. In the present exemplary embodiment, the learning data contains the table name of the table and the meaning of the table. In the following example, it is assumed that a set of combinations of table names and the meanings of tables is stored in the learning-data storage unit 3 as the learning data. The number of table names to be combined with the meaning of one table may be plural.

FIG. 19 is a schematic diagram showing an example of a combination of table names and the meaning of a table. FIG. 19 shows the combinations of a plurality of table names such as "Customer tables", "Customer", and the like and the meaning of the table "Customer". Such combinations of the table names and the meaning of the table are determined by determining the meaning of an existing table to which a table name is assigned and associating the table name with the meaning of the table by the user. The learning-data storage unit 3 stores a set of combinations of table names and the meanings of tables as shown in FIG. 19.

A table-meaning-model generation unit 4 generates a table-meaning model based on the learning data. The method of machine learning when the table-meaning model is generated is not particularly limited. In the present exemplary embodiment, the table-meaning-model generation unit 4 generates a table-meaning model for estimating the meaning of a table from the table name. It can be said that this table-meaning model shows the regularity between the table name and the meaning of the table of the table.

Figures 20, 21, 22:
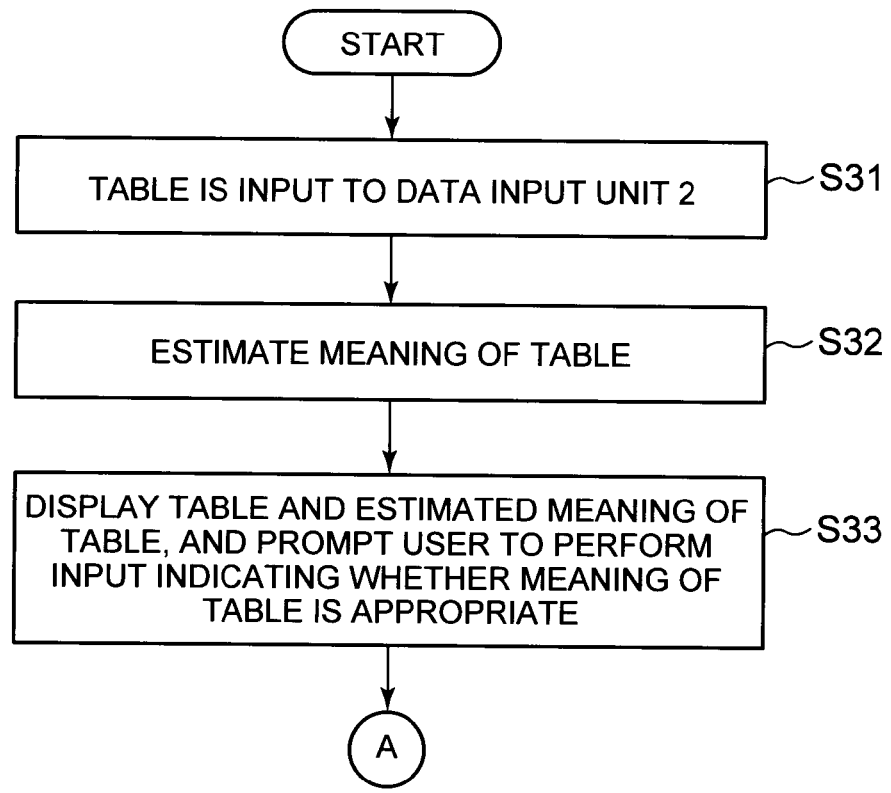
FIG. 20 It depicts an explanatory diagram showing an example of a table-meaning model in a third exemplary embodiment.
FIG. 21 It depicts a schematic diagram showing an example of correspondence relation between explanatory variables which are elements of x and character strings.
FIG. 22 It depicts a flowchart showing an example of processing progress when a table as a meaning estimation target is input.

FIG. 20 is an explanatory diagram showing an example of a table-meaning model in the third exemplary embodiment. Both of W and x shown in FIG. 20 are column vectors, and W and x are appropriately indicated as transposed matrices of row vectors.

The explanatory variables as the elements of x are different from the explanatory variables in the first and second exemplary embodiments. In the third exemplary embodiment, the explanatory variables as the elements of x each correspond to a different character string. One explanatory variable is a variable indicating how many character strings corresponding to the explanatory variable exist when a character string representing a table name is separated by a predetermined method. In the present exemplary embodiment, as the method for separating a character string representing a table name, a case of adopting a method for separating a character string for every two characters is described as an example. Accordingly, it is assumed that each explanatory variable as the element of x corresponds to a character string consisting of two characters.

Here, if the order of the two characters is different, the character strings are handled as different character strings. For example, "ab" and "ba" are handled as different character strings. In addition, the character string may be a character string having two identical characters (for example, "aa"). Furthermore, in the present exemplary embodiment, it is described, as an example, a case in which capital letters and small letters are not distinguished. In the present exemplary embodiment, the number of character strings consisting of two alphabets satisfying these conditions is "n". In the present exemplary embodiment, "n" is set as the number of elements of each of x and W.

FIG. 21 is a schematic diagram showing an example of correspondence relation between explanatory variables which are the elements of x and character strings. In the example shown in FIG. 21, for example, the explanatory variable $x_1$ corresponds to the character string "aa", and the explanatory variable $x_h$ corresponds to the character string "st". For example, the explanatory variable $x_h$ indicates how many character strings "st" exist when the character string representing a table name is separated for every two characters. For example, when the table name "CustomerTables" is separated for every two characters, there is one character string "st", and $x_h=1$ for the table name "CustomerTables". Furthermore, when the table name is separated for every two characters, if there is no character string "st", $x_h=0$, and if there are two character strings "st", $x_h=2$. This is similarly applied to other explanatory variables. The table-meaning-model generation unit 4 sets the values of the explanatory variables of $x_1$ to $x_n$ for each table name included in the learning data. The vector x in which the values of the explanatory variables of $x_1$ to $x_n$ are determined is referred to as a table feature.

The table-meaning model also includes the table-meaning set. FIG. 20 shows a set of {Customer, Store, . . . } as an example of the table-meaning set. The number of meanings of tables belonging to the table-meaning set is "k".

$W=(w_1, w_2, w_3, \ldots, w_n)^T$ is determined for the meaning of each table belonging to the table-meaning set. W corresponding to the meaning of the j-th table is referred to as $W_j$. Since the number of meanings of tables is k, the k number of vectors W are determined. Also, the number of elements of W is the same as the number of elements of x, and is "n". This point is similar to the first exemplary embodiment.

In addition, f(x) shown in FIG. 20 means, in the case in which a table name is given and one meaning of the table is selected from the table-meaning set, the certainty that the selected meaning of the table corresponds to the meaning of the table having the table name.

The table-meaning-model generation unit 4 determines the table feature for each table name included in the learning data. The table-meaning-model generation unit 4 further generates a table-meaning model by determining, based on the correspondence relation between each table feature and the meaning of each table included in the learning data, the table-meaning set and W for the meaning of each table belonging to the table-meaning set. In the generated table-meaning model, the elements of x are represented by variables. On the other hand, the elements of W determined for the meaning of each table are specific values.

When generating a table-meaning model, the table-meaning-model generation unit 4 causes the table-meaning-model storage unit 5 to store the table-meaning model.

A table-meaning estimation unit 6 estimates the meaning of the table input to the data input unit 2 based on the table-meaning model stored in the table-meaning-model storage unit 5. The table-meaning estimation unit 6 determines the table feature based on the table name assigned to the input table. Then, the table-meaning estimation unit 6 sequentially selects the meaning of the table one by one from the table-meaning set, and calculates the certainty f(x) using W corresponding to the selected meaning of the table and the table feature. That is, when the table feature is $x_{data}$, the table-meaning estimation unit 6 calculates the certainty f(x) with the expression of $W^T x_{data}$. The table-meaning estimation unit 6 determines the meaning of the table with the highest certainty as the estimation result of the meaning of the input table.

In the present exemplary embodiment, it is described, as an example, a case in which the table-meaning model is represented as shown in FIGS. 20 and 21 and the table-meaning estimation unit 6 estimates the meaning of the input table by the above calculation. However, the form of the table-meaning model is not limited to the above example. In addition, the table-meaning estimation unit 6 is only required to estimate the meaning of the input table by a calculation according to the form of the table-meaning model.

A display control unit 7 is similar to the display control unit 7 in the first exemplary embodiment.

When the input indicating that the meaning of the table displayed by the display control unit 7 (that is, the estimated meaning of the table) is appropriate is performed, a learning-data addition unit 8 adds the combination of the table name assigned to the table input to the data input unit 2 and the estimated meaning of the table to the existing learning data as learning data.

Alternatively, the input indicating that the meaning of the table displayed by the display control unit 7 (that is, the estimated meaning of the table) is not appropriate is performed, the learning-data addition unit 8 adds the combination of the table name assigned to the table input to the data input unit 2 and the meaning of the table accepted from the user by the display control unit 7 to the existing learning data as learning data.

When the learning-data addition unit 8 adds the learning data to the learning-data storage unit 3, the table-meaning-model generation unit 4 generates a table-meaning model again.

The processing progress in the third exemplary embodiment of the present invention is described below.

First, an example of processing progress when a table-meaning model is generated is described. The table-meaning estimation system 1 generates a table-meaning model before accepting input of a table as a meaning estimation target.

It is assumed that the learning-data storage unit 3 stores a set of combinations of table names and meanings of tables as shown in FIG. 19 as learning data.

The table-meaning-model generation unit 4 loads the learning data from the learning-data storage unit 3.

Next, the table-meaning-model generation unit 4 generates a table-meaning model based on the learning data. At this time, the table-meaning-model generation unit 4 determines the table feature for each table name included in the learning data. Here, processing for determining a table feature in the case of "CustomerTables" in the table names shown in FIG. 19 is described as an example. The table-meaning-model generation unit 4 separates "CustomerTables" for every two characters. As a result, each one of character strings of "Cu", "st", "om", "er", "Ta", "bl", and "es" is obtained. Thus, the table-meaning-model generation unit 4 sets the value 1 of the explanatory variable corresponding to "Cu" among the explanatory variables which are the elements of x to "1". Similarly, the table-meaning-model generation unit 4 also sets each value of the explanatory variables corresponding to "st", "om", "er", "Ta", "bl", and "es" to "1". The table-meaning-model generation unit 4 sets the values of the other explanatory variables to "0". As a result, a table feature of $x=(0, 0, 0, \ldots, 1, \ldots, 0)^T$ is obtained. This table feature contains seven elements of "1".

The table-meaning-model generation unit 4 similarly determines table features of the other table names contained in the learning data. When the number of characters of the table name is odd, for example, the last one character may be ignored.

Then, the table-meaning-model generation unit 4 determines, based on the relation information between the table feature and the meaning of each table contained in the learning data, a table-meaning set and the vector W in the expression $f(x)=W^T x$ for the meaning of each table belonging to the table-meaning set. As a result, the table-meaning model is determined.

The table-meaning-model generation unit 4 causes the table-meaning-model storage unit 5 to store the generated table-meaning model.

Figure 23:
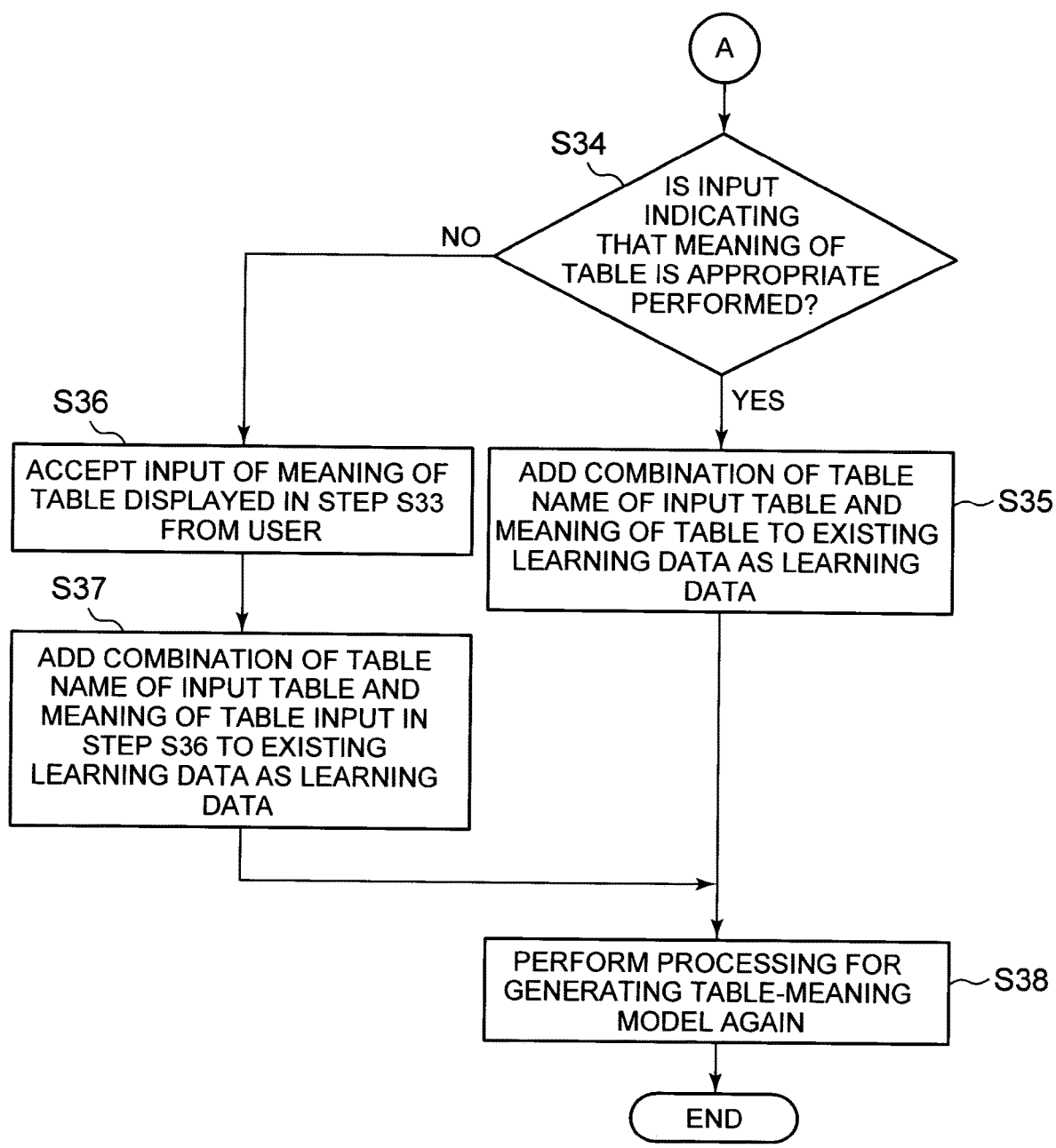
FIG. 23 It depicts a flowchart showing an example of processing progress when a table as a meaning estimation target is input.

Next, the processing progress when a table as a meaning estimation target is input to the table-meaning estimation system 1 is described. FIGS. 22 and 23 are flowcharts showing an example of processing progress when a table as a meaning estimation target is input.

First, a table is input to the data input unit 2 (step S31). In step S31, a table to which a table name is assigned is input. That is, in step S31, a table name is necessarily input. Here, it is assumed that a table to which the table name "CustomersTables" is assigned is input.

Next, the table-meaning estimation unit 6 estimates the meaning of the table input in step S31 based on the table-meaning model (step S32).

In step S32, the table-meaning estimation unit 6 loads the table-meaning model from a table-meaning-model storage unit 5.

The table-meaning estimation unit 6 further determines the table feature based on the table name assigned to the input table. At this time, the table-meaning estimation unit 6 separates the table name for every two characters. In this example, the table-meaning estimation unit 6 separates "CustomersTables" for every two characters. When the number of characters of the table name is odd, for example, the last one character may be ignored. As a result, two character strings of "st" are obtained, each one of character strings of "Cu", "om", "er", "ab", and "le" is obtained. As described above, in the present exemplary embodiment, it is described, as an example, a case in which capital letters and small letters are not distinguished. Thus, the table-meaning estimation unit 6 sets the value of the explanatory variable $x_h$ corresponding to "st" among the explanatory variables which are the elements of x (see FIGS. 21) to "2". The table-meaning estimation unit 6 further sets each value of the explanatory variables corresponding to "Cu", "om", "er", "ab", and "le" to "1". The table-meaning estimation unit 6 determines the values of the other explanatory variables to "0". As a result, a table feature of $x=(0, 1, 0, \ldots, 1, \ldots, 2, \ldots, 0)^T$ is obtained. This table feature contains five elements of "1" and one element of "2". This table feature is $x_{data}$.

Then, the table-meaning estimation unit 6 sequentially selects the meaning of the table one by one from the table-meaning set, and calculates the certainty f(x) using W corresponding to the selected meaning of the table and the table feature. W corresponding to the meaning of the j-th table is referred to as $W_j$. When selecting the meaning of the first table "Customer" shown in FIG. 20, the table-meaning estimation unit 6 calculates the certainty that "Customer" is the meaning of the input table using $W_1$ corresponding to "Customer" and the above table feature $x_{data}$ with the expression of $f(x)=W_1^T x_{data}$. The table-meaning estimation unit 6 performs similar calculation for the meanings of other tables such as "Store" and calculates the certainty that the meaning of the selected table corresponds to the meaning of the input table.

Then, the table-meaning estimation unit 6 determines the meaning of the table with the highest certainty as the estimation result of the meaning of the input table.

After the processing in step S32 is performed, the display control unit 7 displays the table input in step S31 and the meaning of the table estimated in step S32 on the display device, and prompts the user to perform input indicating whether the meaning of the table is appropriate (step S33). The step S33 is similar to the step S13 (see FIG. 7), and the form of the screen displayed in the step S33 is similar to, for example, the form of the screen shown in FIG. 4.

When the user determines that the meaning of the table displayed in step S33 is appropriate as the meaning of the table displayed in step S33 (that is, the input table), the user operates the GUI according to the determination (For example, clicks the button 51 shown in FIG. 4). That is, the display control unit 7 accepts the input indicating that the displayed meaning of the table is appropriate (Yes in step S34).

Then, the learning-data addition unit 8 adds, to the existing learning data, the combination of the table name of the table input in step S31 and the meaning of the table (the estimated meaning of the table) (step S35). That is, the learning-data addition unit 8 adds the combination of the table name and the estimated meaning of the table to the learning data stored in the learning-data storage unit 3. After the processing in step S35 is performed, the processing proceeds to step S38.

Alternatively, when the user determines that the meaning of the table displayed in step S33 is not appropriate as the meaning of the table displayed in step S33 (that is, the input table), the user operates the GUI according to the determination (For example, clicks the button 52 shown in FIG. 4). That is, the display control unit 7 accepts the input indicating that the displayed meaning of the table is not appropriate (No in step S34).

Then, the display control unit 7 accepts the input of the meaning of the table displayed in step S33 from the user (step S36). The step S36 is similar to the step S16 (see FIG. 8), and the form of the screen displayed in the step S36 is similar to, for example, the form of the screen shown in FIG. 5. The display control unit 7 accepts the input of the meaning of the table from the user via, for example, the input field 53 (see FIG. 5).

Following step S36, the learning-data addition unit 8 adds, to the existing learning data, the combination of the table name of the table input in step S31 and the meaning of the table input in step S36 (step S37). That is, the learning-data addition unit 8 adds the combination of the table name and the meaning of the table input by the user to the learning data stored in the learning-data storage unit 3. After the processing in step S37 is performed, the processing proceeds to step S38.

In the case of shifting from step S35 or S37 to step S38, the table-meaning-model generation unit 4 performs the processing for generating a table-meaning model again based on the learning data stored in the learning-data storage unit 3 at that time (step S38). In other words, the table-meaning-model generation unit 4 learns a table-meaning model again using the existing learning data and the added learning data.

According to the present exemplary embodiment, the table-meaning-model generation unit 4 generates a table-meaning model for estimating the meaning of a table from a table name. Then, the table-meaning estimation unit 6 estimates the meaning of the table based on the table name assigned to the input table and the table-meaning model. Thus, according to the present exemplary embodiment, it is possible to estimate the meaning of the table. Accordingly, also in the present exemplary embodiment, effects similar to those of the first exemplary embodiment can be obtained.

Furthermore, the user determines whether the meaning of the table estimated by the table-meaning estimation unit 6 is appropriate. Then, when it is determined that the meaning of the table is appropriate, the learning-data addition unit 8 adds, to the learning data, the combination of the table name input in step S31 and the meaning of the table estimated by the table-meaning estimation unit 6. When it is determined that the meaning of the estimated table is not appropriate, the display control unit 7 accepts the input indicating an appropriate meaning as the meaning of the table input in step S31 from the user, and the learning-data addition unit 8 adds, to the learning data, the combination of the table name input in step S31 and the meaning of the table input by the user. Thus, it is possible to improve the accuracy of the table-meaning model. Especially, when it is determined that the meaning of the table estimated by the table-meaning estimation unit 6 is not appropriate, the meaning of the table determined to be appropriate by the user is added to the learning data, and the accuracy of the table-meaning model is effectively improved.

Similarly to the modification of the first exemplary embodiment, a learning system (not shown) different from the table-meaning estimation system 1 may generate a table-meaning model, and the table-meaning estimation system 1 may not generate a table-meaning model. In this case, the table-meaning estimation system 1 includes, for example, the data input unit 2, the table-meaning-model storage unit 5, the table-meaning estimation unit 6, and the display control unit 7 similarly to the case shown in FIG. 10. The table-meaning-model storage unit 5 stores the table-meaning model generated by the learning system. After the processing in step S32 is performed, the display control unit 7 is only required to display the table input in step S31 and the meaning of the table estimated in step S32. Then, the processing may be terminated at that point.

Figure 24:
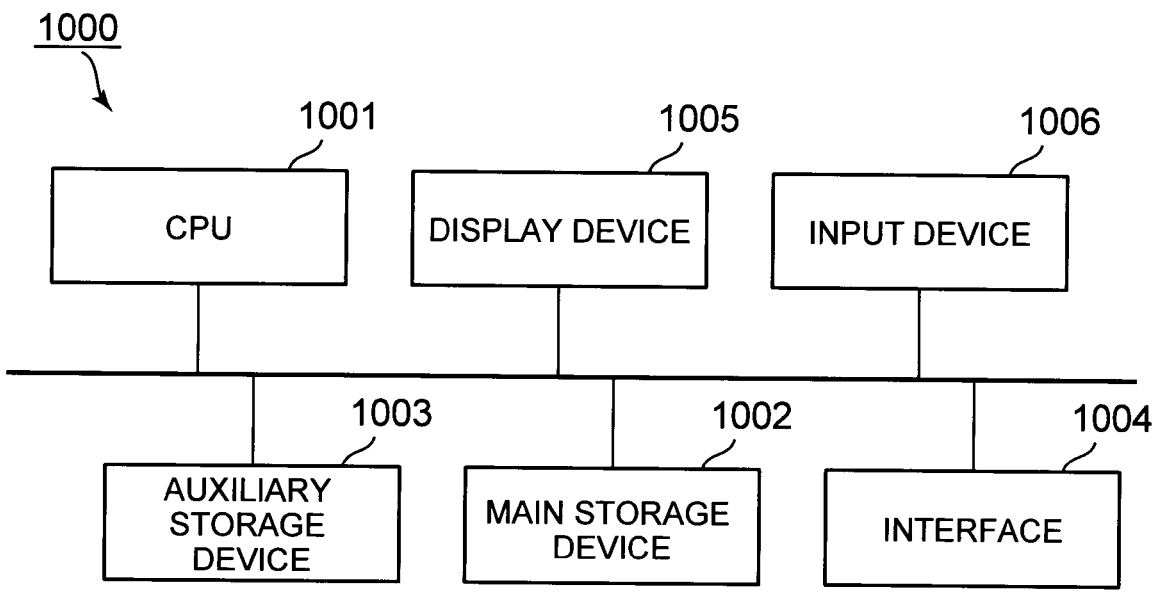
FIG. 24 It depicts a schematic block diagram showing a configuration example of a computer according to each exemplary embodiment of the present invention.

FIG. 24 is a schematic block diagram showing a configuration example of a computer according to each exemplary embodiment of the present invention. A computer 1000 includes a CPU 1001, a main storage device 1002, an auxiliary storage device 1003, an interface 1004, a display device 1005, and an input device 1006. In the example shown in FIG. 24, the input device 1006 corresponds to the data input unit 2.

The table-meaning estimation system 1 in each embodiment of the present invention is implemented by the computer 1000. The operation of the table-meaning estimation system 1 is stored in the auxiliary storage device 1003 in the form of a program (the table-meaning estimation program). The CPU 1001 loads the program from the auxiliary storage device 1003, develops the program in the main storage device 1002, and executes the above processing in accordance with the program.

The auxiliary storage device 1003 is an example of a non-transitory tangible medium. Other examples of non-transitory tangible mediums include a magnetic disk, a magneto-optical disk, a CD-ROM, a DVD-ROM, a semiconductor memory, and the like which are connected via the interface 1004. Furthermore, when this program is distributed to the computer 1000 through a communication line, the computer 1000 receiving the distribution may develop the program in the main storage device 1002 and execute the above processing.

The program may be for implementing a part of the above processing. Furthermore, the program may be a differential program that implements the above processing in combination with another program already stored in the auxiliary storage device 1003.

In addition, a part of or all of the constituent elements of each device are implemented by a general purpose or dedicated circuitry, a processor, or the like, or a combination thereof. These may be constituted by a single chip, or by a plurality of chips connected via a bus. A part of or all of the constituent elements of each device may be implemented by a combination of the above circuitry or the like and a program.

In the case in which a part of or all of the constituent elements of each device is implemented by a plurality of information processing devices, circuitries, or the like, the information processing devices, circuitries, or the like may be arranged in a concentrated manner, or dispersedly. For example, the information processing devices, circuitries, or the like may be implemented as a form in which each is connected via a communication network, such as a client-and-server system or a cloud computing system.

Figure 25:
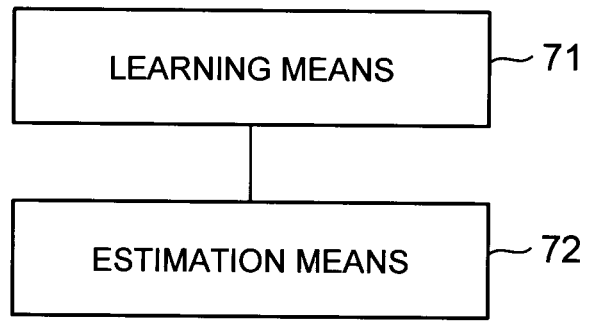
FIG. 25 It depicts a block diagram showing the outline of the present invention.

Next, the outline of the present invention is described. FIG. 25 is a block diagram showing the outline of the present invention. The table-meaning estimation system of the present invention includes a learning means 71 and an estimation means 72.

The learning means 71 (for example, the table-meaning-model generation unit 4) learns, based on learning data containing a meaning of a column in a table and a meaning of the table, a model indicating regularity between the meaning of the column in the table and the meaning of the table (for example, a table-meaning model).

The estimation means 72 (for example, the table-meaning estimation unit 6) estimates, based on a meaning of a column in a table to be input and the model, the meaning of the table.

With such a configuration, it is possible to estimate the meaning of the table.

Alternatively, the table-meaning estimation system may include a column-meaning estimation means (for example, the column-meaning estimation unit 9) for estimating the meaning of the column from an attribute value of the column in the table to be input, and the estimation means 72 may estimate the meaning of the table based on the estimated meaning of the column and the model.

Alternatively, the table-meaning estimation system may include a display control means (for example, the display control unit 7) for displaying the estimated meaning of the table and accepting input indicating whether the meaning of the table is appropriate from a user, and a learning-data addition means (for example, the learning-data addition unit 8) for adding learning data.

Furthermore, the table-meaning estimation system may have a configuration in which the display control means accepts, when accepting the input indicating that the displayed meaning of the table is not appropriate from the user, input of the meaning of the table from the user, the learning-data addition means adds, when the input indicating that the meaning of the table is appropriate is performed, a combination of the table and the meaning of the table displayed by the display control means to existing learning data as the learning data, and adds, when the input indicating that the meaning of the table is not appropriate is performed, a combination of the table and the meaning of the table accepted by the display control means from the user to the existing learning data as the learning data, and the learning means learns, when the learning data is added, a model again using the existing learning data and the added learning data.

In addition, in the configuration shown in FIG. 25, the learning means 71 and the estimation means 72 may operate as follows.

The learning means 71 (for example, the table-meaning-model generation unit 4) learns, based on learning data containing a table name of a table and a meaning of the table, a model indicating regularity between the table name and the meaning of the table (for example, a table-meaning model).

The estimation means 72 (for example, the table-meaning estimation unit 6) estimates, based on a table name of a table to be input and the model, the meaning of the table.

In this case, it is also possible to estimate the meaning of the table.

In this case, the table-meaning estimation system may include a display control means (for example, the display control unit 7) for displaying the estimated meaning of the table and accepting input indicating whether the meaning of the table is appropriate from a user, and a learning-data addition means (for example, the learning-data addition unit 8) for adding learning data in response to the input from the user.

Furthermore, the table-meaning estimation system may have a configuration in which the display control means accepts, when accepting the input indicating that the displayed meaning of the table is not appropriate from the user, input of the meaning of the table from the user, the learning-data addition means adds, when the input indicating that the meaning of the table is appropriate is performed, a combination of the table name of the table and the meaning of the table displayed by the display control means to existing learning data as the learning data, and adds, when the input indicating that the meaning of the table is not appropriate is performed, a combination of the table name of the table and the meaning of the table accepted by the display control means from the user to the existing learning data as the learning data, and the learning means learns, when the learning data is added, a model again using the existing learning data and the added learning data.

Figure 26:
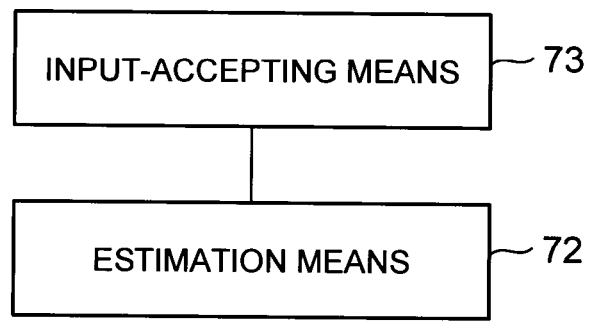
FIG. 26 It depicts a block diagram showing another example of the outline of the present invention.

FIG. 26 is a block diagram showing another example of the outline of the present invention. The table-meaning estimation system shown in FIG. 26 includes an input accepting means 73 and an estimation means 72.

The input accepting means 73 (for example, the data input unit 2) accepts input of a table.

The estimation means 72 (for example, the table-meaning estimation unit 6) estimates a meaning of the table based on a meaning of a column in the table and a model learnt beforehand.

The model (for example, the table-meaning model) is a model learnt based on learning data containing the meaning of the column in the table and the meaning of the table, and indicating regularity between the meaning of the column in the table and the meaning of the table.

With such a configuration, it is possible to estimate the meaning of the table.

Alternatively, the table-meaning estimation system may include a column-meaning estimation means (for example, the column-meaning estimation unit 9) for estimating the meaning of the column from an attribute value of the column in the table to be input, and the estimation means 72 may estimate the meaning of the table based on the estimated meaning of the column and the model.

Furthermore, in the configuration shown in FIG. 26, the input accepting means 73 and the estimation means 72 may operate as follows.

The input accepting means 73 (for example, the data input unit 2) accepts input of a table.

The estimation means 72 (for example, the table-meaning estimation unit 6) estimates a meaning of the table based on a table name of the table and a model learnt beforehand.

The model (for example, the table-meaning model) is a model learnt based on learning data containing the table name of the table and the meaning of the table, and indicating regularity between the table name and the meaning of the table.

In this case, it is also possible to estimate the meaning of the table.

Note that, a part of or all of the above exemplary embodiments can also be described as following supplementary notes, but is not limited to the following.

(Supplementary Note 1)

A table-meaning estimation system including: a learning means for learning, based on learning data containing a meaning of a column in a table and a meaning of the table, a model indicating regularity between the meaning of the column in the table and the meaning of the table; and an estimation means for estimating, based on a meaning of a column in a table to be input and the model, the meaning of the table.

(Supplementary Note 2)

The table-meaning estimation system according to supplementary note 1, further including:

a column-meaning estimation means for estimating the meaning of the column from an attribute value of the column in the table to be input, in which the estimation means estimates the meaning of the table based on the estimated meaning of the column and the model.

(Supplementary Note 3)

The table-meaning estimation system according to supplementary note 1 or 2, further including:

a display control means for displaying the estimated meaning of the table and accepting input indicating whether the meaning of the table is appropriate from a user; and a learning-data addition means for adding learning data in response to the input from the user.

(Supplementary Note 4)

The table-meaning estimation system according to supplementary note 3, in which the display control means accepts, when accepting the input indicating that the displayed meaning of the table is not appropriate from the user, input of the meaning of the table from the user, the learning-data addition means adds, when the input indicating that the meaning of the table is appropriate is performed, a combination of the table and the meaning of the table displayed by the display control means to existing learning data as the learning data, and adds, when the input indicating that the meaning of the table is not appropriate is performed, a combination of the table and the meaning of the table accepted by the display control means from the user to the existing learning data as the learning data, and the learning means learns, when the learning data is added, a model again using the existing learning data and the added learning data.

(Supplementary Note 5)

A table-meaning estimation system including:

an input accepting means for accepting input of a table; and an estimation means for estimating a meaning of the table based on a meaning of a column in the table and a model learnt beforehand, in which the model is a model learnt based on learning data containing the meaning of the column in the table and the meaning of the table, and indicating regularity between the meaning of the column in the table and the meaning of the table.

(Supplementary Note 6)

The table-meaning estimation system according to supplementary note 5, further including:

a column-meaning estimation means for estimating the meaning of the column from an attribute value of a column in a table to be input, in which the estimation means estimates the meaning of the table based on the estimated meaning of the column and the model.

(Supplementary Note 7)

A table-meaning estimation system including:

a learning means for learning, based on learning data containing a table name of a table and a meaning of the table, a model indicating regularity between the table name and the meaning of the table; and an estimation means for estimating, based on a table name of a table to be input and the model, the meaning of the table.

(Supplementary Note 8)

The table-meaning estimation system according to supplementary note 7, further including:

a display control means for displaying the estimated meaning of the table and accepting input indicating whether the meaning of the table is appropriate from a user; and a learning-data addition means for adding learning data in response to the input from the user.

(Supplementary Note 9)

The table-meaning estimation system according to supplementary note 8, in which the display control means accepts, when accepting the input indicating that the displayed meaning of the table is not appropriate from the user, input of the meaning of the table from the user, the learning-data addition means adds, when the input indicating that the meaning of the table is appropriate is performed, a combination of the table name of the table and the meaning of the table displayed by the display control means to existing learning data as the learning data, and adds, when the input indicating that the meaning of the table is not appropriate is performed, a combination of the table name of the table and the meaning of the table accepted by the display control means from the user to the existing learning data as the learning data, and the learning means learns, when the learning data is added, a model again using the existing learning data and the added learning data.

(Supplementary Note 10)

A table-meaning estimation system including:

an input accepting means for accepting input of a table; and an estimation means for estimating a meaning of the table based on a table name of the table and a model learnt beforehand, in which the model is a model learnt based on learning data containing the table name of the table and the meaning of the table, and indicating regularity between the table name and the meaning of the table.

(Supplementary Note 11)

A table-meaning estimation method including:

learning, based on learning data containing a meaning of a column in a table and a meaning of the table, a model indicating regularity between the meaning of the column in the table and the meaning of the table; and estimating, based on a meaning of a column in a table to be input and the model, the meaning of the table.

(Supplementary Note 12)

A table-meaning estimation method including:

accepting input of a table; and estimating a meaning of the table based on a meaning of a column in the table and a model learnt beforehand, in which the model is a model learnt based on learning data containing the meaning of the column in the table and the meaning of the table, and indicating regularity between the meaning of the column in the table and the meaning of the table.

(Supplementary Note 13)

A table-meaning estimation method including:

learning, based on learning data containing a table name of a table and a meaning of the table, a model indicating regularity between the table name and the meaning of the table; and estimating, based on a table name of a table to be input and the model, the meaning of the table.

(Supplementary Note 14)

A table-meaning estimation method including:

accepting input of a table; and estimating a meaning of the table based on a table name of the table and a model learnt beforehand, in which the model is a model learnt based on learning data containing the table name of the table and the meaning of the table, and indicating regularity between the table name and the meaning of the table.

(Supplementary Note 15)

A table-meaning estimation program causing a computer to execute:

learning processing for learning, based on learning data containing a meaning of a column in a table and a meaning of the table, a model indicating regularity between the meaning of the column in the table and the meaning of the table; and estimation processing for estimating, based on a meaning of a column in a table to be input and the model, the meaning of the table.

(Supplementary Note 16)

A table-meaning estimation program causing a computer to execute:

input-accepting processing for accepting input of a table; and estimation processing for estimating a meaning of the table based on a meaning of a column in the table and a model learnt beforehand, in which the model is a model learnt based on learning data containing the meaning of the column in the table and the meaning of the table, and indicating regularity between the meaning of the column in the table and the meaning of the table.

(Supplementary Note 17)

A table-meaning estimation program causing a computer to execute:

learning processing for learning, based on learning data containing a table name of a table and a meaning of the table, a model indicating regularity between the table name and the meaning of the table; and estimation processing for estimating, based on a table name of a table to be input and the model, the meaning of the table.

(Supplementary Note 18)

A table-meaning estimation program causing a computer to execute:

input-accepting processing for accepting input of a table; and estimation processing for estimating a meaning of the table based on a table name of the table and a model learnt beforehand, in which the model is a model learnt based on learning data containing the table name of the table and the meaning of the table, and indicating regularity between the table name and the meaning of the table.

The present invention has been described with reference to the exemplary embodiments and examples, but is not limited to the above exemplary embodiments and examples. Various changes that can be understood by those skilled in the art within the scope of the present invention can be made to the configurations and details of the present invention.

This application claims priority based on Japanese Patent Application No. 2016-154384 filed on Aug. 5, 2016, the disclosure of which is incorporated herein in its entirety.

INDUSTRIAL APPLICABILITY

The present invention is suitably applied to a table-meaning estimation system that estimates the meaning of a table.

REFERENCE SIGNS LIST

1 Table-meaning estimation system
2 Data input unit
3 Learning-data storage unit
4 Table-meaning-model generation unit
5 Table-meaning-model storage unit
6 Table-meaning estimation unit
7 Display control unit
8 Learning-data addition unit

The invention claimed is:

1. A table-meaning estimation system comprising:

a learning unit, implemented by a processor, that learns, based on learning data containing a meaning of a column in a table and a meaning of the table, a model indicating regularity between the meaning of the column in the table and the meaning of the table; and an estimation unit, implemented by the processor, that estimates, based on a meaning of a column in a table to be input and the model, the meaning of the table;

a display control unit, implemented by the processor, that displays the estimated meaning of the table and accepts input indicating whether the meaning of the table is appropriate from a user; and a learning-data addition unit, implemented by the processor, that adds learning data in response to the input from the user, wherein the table-meaning estimation system further comprises:

a column-meaning estimation unit, implemented by the processor, that estimates the meaning of the column from an attribute value of the column in the table to be input, wherein the estimation unit estimates the meaning of the table based on the estimated meaning of the column and the model, wherein the model includes a set of meanings of a table, a vector x whose elements are explanatory variables corresponding to meanings of columns and vectors W, elements of each of W are determined for each of the meanings belonging to the set by the learning unit, wherein a value of each explanatory variable is determined as "1" when corresponding meaning of a column is included in the table to be input, or determined as "0"

when corresponding meaning of a column is not included in the table to be input, and wherein the estimation unit sequentially selects the meaning one by one from the set, calculates a certainty that a selected meaning corresponds to the meaning of the table to be input by calculating $W^Tx$, and determines the meaning with the highest certainty as the meaning of the table to be input.

2. The table-meaning estimation system according to claim 1, wherein the display control unit:
accepts, when accepting the input indicating that the displayed meaning of the table is not appropriate from the user, input of the meaning of the table from the user, the learning-data addition unit:
adds, when the input indicating that the meaning of the table is appropriate is performed, a combination of the table and the meaning of the table displayed by the display control unit to existing learning data as the learning data, and
adds, when the input indicating that the meaning of the table is not appropriate is performed, a combination of the table and the meaning of the table accepted by the display control unit from the user to the existing learning data as the learning data, and the learning unit:
learns, when the learning data is added, a model again using the existing learning data and the added learning data.

3. A table-meaning estimation method comprising:
learning, based on learning data containing a meaning of a column in a table and a meaning of the table, a model indicating regularity between the meaning of the column in the table and the meaning of the table;
estimating, based on a meaning of a column in a table to be input and the model, the meaning of the table;
displaying the estimated meaning of the table and accepting input indicating whether the meaning of the table is appropriate from a user; and
adding learning data in response to the input from the user,
wherein the table-meaning estimation method further comprises:
estimating the meaning of the column from an attribute value of the column in the table to be input,
wherein when estimating the meaning of the table, estimating the meaning of the table based on the estimated meaning of the column and the model,
wherein the model includes a set of meanings of a table, a vector x whose elements are explanatory variables corresponding to meanings of columns and vectors W, elements of each of W are determined for each of the meanings belonging to the set in processing of the learning model,
wherein a value of each explanatory variable is determined as "1" when corresponding meaning of a column is included in the table to be input, or determined as "0" when corresponding meaning of a column is not included in the table to be input, and wherein the table-meaning estimation method comprises:
when estimating the meaning of the table, sequentially selecting the meaning one by one from the set, calculating a certainty that a selected meaning corresponds to the meaning of the table to be input by calculating $W^Tx$, and determining the meaning with the highest certainty as the meaning of the table to be input.

4. A non-transitory computer-readable recording medium in which a table-meaning estimation program is recorded, the table-meaning estimation program causing a computer to execute:
learning processing for learning, based on learning data containing a meaning of a column in a table and a meaning of the table, a model indicating regularity between the meaning of the column in the table and the meaning of the table;
estimation processing for estimating, based on a meaning of a column in a table to be input and the model, the meaning of the table;
display control processing for displaying the estimated meaning of the table and accepting input indicating whether the meaning of the table is appropriate from a user; and
a learning-data addition processing for adding learning data in response to the input from the user,
wherein the table-meaning estimation program further causes the computer to execute:
processing for estimating the meaning of the column from an attribute value of the column in the table to be input,
wherein the table-meaning estimation program causes the computer to execute, in the estimation processing, estimating the meaning of the table based on the estimated meaning of the column and the model,
wherein the model includes a set of meanings of a table, a vector x whose elements are explanatory variables corresponding to meanings of columns and vectors W, elements of each of W are determined for each of the meanings belonging to the set in the learning processing,
wherein a value of each explanatory variable is determined as "1" when corresponding meaning of a column is included in the table to be input, or determined as "0" when corresponding meaning of a column is not included in the table to be input, and
wherein the table-meaning estimation program causes the computer to execute, the estimation processing, sequentially selecting the meaning one by one from the set, calculating a certainty that a selected meaning corresponds to the meaning of the table to be input by calculating $W^Tx$, and determining the meaning with the highest certainty as the meaning of the table to be input.

* * * * *